(12) United States Patent
Valouch et al.

(10) Patent No.: US 11,913,880 B2
(45) Date of Patent: Feb. 27, 2024

(54) SPECTROMETER DEVICE

(71) Applicant: trinamiX GmbH, Ludwigshafen am Rhein (DE)

(72) Inventors: Sebastian Valouch, Ludwigshafen (DE); Wilfried Hermes, Ludwigshafen (DE); Robert Send, Ludwigshafen (DE); Robert Gust, Ludwigshafen (DE); Bertram Feuerstein, Ludwigshafen (DE); Ingmar Bruder, Ludwigshafen (DE)

(73) Assignee: TRINAMIX GMBH, Ludwigshafen am Rhein (DE)

( * ) Notice: Subject to any disclaimer, the term of this patent is extended or adjusted under 35 U.S.C. 154(b) by 690 days.

(21) Appl. No.: 17/053,187

(22) PCT Filed: May 10, 2019

(86) PCT No.: PCT/EP2019/062032
§ 371 (c)(1),
(2) Date: Nov. 5, 2020

(87) PCT Pub. No.: WO2019/215323
PCT Pub. Date: Nov. 14, 2019

(65) Prior Publication Data
US 2021/0140878 A1 May 13, 2021

(30) Foreign Application Priority Data
May 11, 2018 (EP) .................................. 18171823.0

(51) Int. Cl.
*G01N 21/359* (2014.01)
*G01C 3/00* (2006.01)
*G01S 17/08* (2006.01)

(52) U.S. Cl.
CPC ............. *G01N 21/359* (2013.01); *G01C 3/00* (2013.01); *G01S 17/08* (2013.01); *G01N 2201/0635* (2013.01)

(58) Field of Classification Search
CPC ......... G01N 21/359; G01N 2201/0635; G01C 3/00; G01S 17/08; G01S 7/4802;
(Continued)

(56) References Cited

U.S. PATENT DOCUMENTS 9,389,315 B2  7/2016  Bruder et al.
9,557,856 B2  1/2017  Send et al.
(Continued)

FOREIGN PATENT DOCUMENTS

JP  2001349829 A  12/2001
JP  2016510397 A   4/2016
(Continued)

OTHER PUBLICATIONS

"FIP/XperYenZ", Feb. 4, 2018, XP055529180, URL: https://web.archive.org/web/20180204115808/http://www.trinamix.de/FIP.
(Continued)

*Primary Examiner* — Kiho Kim
(74) *Attorney, Agent, or Firm* — Armstrong Teasdale LLP

(57) ABSTRACT

Described herein is a spectrometer device. The spectrometer device includes:
at least one filter element adapted to separate at least one incident light beam into a spectrum of constituent wavelength;
at least one sensor element having a matrix of optical sensors, the optical sensors (116,142) each having a light-sensitive area; and
at least one evaluation device configured for determining at least one longitudinal coordinate of an object.

14 Claims, 3 Drawing Sheets

(58) Field of Classification Search
CPC .......... G01S 17/46; G01S 17/86; G01S 17/88; G01J 3/14; G01J 3/18; G01J 3/0278; G01J 3/2803; G01J 2003/1234; G01J 2003/2826
See application file for complete search history.

(56) References Cited

U.S. PATENT DOCUMENTS

| | | | |
|---|---|---|---|
| 2014/0291480 A1* | 10/2014 | Bruder | G01S 17/89 250/206 |
| 2017/0074652 A1 | 3/2017 | Send et al. | |
| 2017/0082486 A1 | 3/2017 | Send et al. | |

FOREIGN PATENT DOCUMENTS

| | | |
|---|---|---|
| JP | 2016537638 A | 12/2016 |
| JP | 2017515111 A | 6/2017 |
| WO | 2012110924 A1 | 8/2012 |
| WO | 2014097181 A1 | 6/2014 |
| WO | 2014198625 A1 | 12/2014 |
| WO | 2016120392 A1 | 8/2016 |
| WO | 2018019921 A1 | 2/2018 |
| WO | 2018091638 A1 | 5/2018 |
| WO | 2018091640 A2 | 5/2018 |
| WO | 2018091649 A1 | 5/2018 |
| WO | 2018167215 A1 | 9/2018 |

OTHER PUBLICATIONS

International Preliminary Report on Patentability for International Patent Application No. PCT/EP2019/062032, dated Nov. 26, 2020, 9 pages.

International Search Report and Written Opinion for corresponding PCT/EP2019/062032 dated Aug. 12, 2019, 10 pages.

\* cited by examiner

SPECTROMETER DEVICE

CROSS-REFERENCE TO RELATED APPLICATIONS

This application is a U.S. National Phase Application of International Patent Application No. PCT/EP2019/062032, filed on May 10, 2019, which claims the benefit of priority to European Patent Application Number 18171823.0, filed May 11, 2018, the entire contents of which are hereby incorporated by reference herein.

FIELD OF THE INVENTION

The invention relates to a spectrometer device, a method for determining at least one difference in at least one light property of at least one light beam originating from at least one object and to various uses of the spectrometer device. Such devices and methods can, in general, be employed for various applications for example, for investigation or monitoring purposes, in particular, for infrared detection, heat detection, flame detection, fire detection, smoke detection, pollution monitoring, monitoring of industrial process, chemical process, food processing process or the like. However, further kinds of applications are possible.

PRIOR ART

Various spectrometer devices and systems are known. A spectrometer generally emits light towards a sample or object and measures reflected, transmitted, scattered or received light. The spectroscopic analysis is based on the difference between the emitted and received light. The spectrometer determines wavelength dependent intensity differences before and after light interaction with the sample or object. The spectrometer may further determine properties such as wavelength dependent polarization differences.

To analyze differences in the light properties before and after interaction with the sample or object, it is important to measure these light properties with minimal alteration. In known spectrometers, pathway of interaction with the sample or object in spectrometers is therefore kept fixed and closed. In mobile spectrometers, pathway of interaction may be variable, e.g. due to movement of the mobile spectrometer. In order to achieve fixed and closed pathway even on mobile spectrometers, it is known to require a direct mechanical contact of the device with the sample or object or to arrange the sample or object within a special box. However, direct mechanical contact may be disadvantageous as it deteriorates the measurement when the optical system is contaminated. Hygiene might also be a concern. Thus, it is desired to prevent direct mechanical contact.

However, contactless mobile spectroscopy is highly distance dependent. For an indirect mobile spectroscopic measurement, a collimated light source may be used to avoid disturbances of the emitted light before interacting with the sample. However, the received light will be non-collimated due to reflection and/or scattering resulting in a distance dependency of the received light intensity. Since the intensity differences are fundamental for the spectroscopic analysis, the distance dependence of the reflected light is a central problem of contactless spectroscopy.

US 2017/074652 A1 describes a detector for determining a position of at least one object, where the detector includes: at least one optical sensor, where the optical sensor has at least one sensor region, where the optical sensor is designed to generate at least one sensor signal in a manner dependent on an illumination of the sensor region by illumination light traveling from the object to the detector; at least one beam-splitting device, where the beam-splitting device is adapted to split the illumination light in at least two separate light beams, where each light beam travels on a light path to the optical sensor; at least one modulation device for modulating the illumination light, where the at least one modulation device is arranged on one of the at least two light paths; and at least one evaluation device, where the evaluation device is designed to generate at least one item of information from the at least one sensor signal.

US 2017/082486 A1 describes an optical detector, the optical detector comprising:—at least one spatial light modulator being adapted to modify at least one property of a light beam in a spatially resolved fashion, having a matrix of pixels, each pixel being controllable to individually modify the at least one optical property of a portion of the light beam passing the pixel;—at least one optical sensor adapted to detect the light beam after passing the matrix of pixels of the spatial light modulator and to generate at least one sensor signal;—at least one modulator device adapted for periodically controlling at least two of the pixels with different modulation frequencies; and—at least one evaluation device adapted for performing a frequency analysis in order to determine signal components of the sensor signal for the modulation frequencies.

PROBLEM ADDRESSED BY THE INVENTION

It is therefore an object of the present invention to provide devices and methods facing the above-mentioned technical challenges of known devices and methods. Specifically, it is an object of the present invention to provide mobile spectroscopic devices and methods for mobile spectroscopy for contactless spectroscopy which reliably can determine spectroscopic information.

SUMMARY OF THE INVENTION

This problem is solved by the invention with the features of the independent patent claims. Advantageous developments of the invention, which can be realized individually or in combination, are presented in the dependent claims and/or in the following specification and detailed embodiments.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such a way with other optional or non-optional features of the invention.

In a first aspect of the present invention, a spectrometer device is disclosed. The term "spectrometer device" relates to an apparatus which is capable of recording signal intensity with respect to the corresponding wavelength of a spectrum or a partition thereof, such as a wavelength interval, wherein the signal intensity may, preferably, be provided as an electrical signal which may be used for further evaluation. Specifically, the spectrometer device is configured for performing at least one spectroscopic measurement. As generally used, the term "spectrum" refers to a electromagnetic spectrum or wavelength spectrum. Specifically, the spectrum may be a partition of the visual spectral range and/or of the infrared (IR) spectral range, especially of the near-infrared (NIR) spectral range. Herein, each part of the spectrum is constituted by an optical signal which is defined by a signal wavelength and the corresponding signal intensity.

As used herein, the term "light", generally, refers to a partition of electromagnetic radiation which is, usually, referred to as "optical spectral range" and which comprises one or more of the visible spectral range, the ultraviolet spectral range and the infrared spectral range. Herein, the term "ultraviolet spectral range", generally, refers to electromagnetic radiation having a wavelength of 1 nm to 380 nm, preferably of 100 nm to 380 nm. Further, in partial accordance with standard ISO-21348 in a valid version at the date of this document, the term "visible spectral range", generally, refers to a spectral range of 380 nm to 760 nm. The term "infrared spectral range" (IR) generally refers to electromagnetic radiation of 760 nm to 1000 μm, wherein the range of 760 nm to 1.5 μm is usually denominated as "near infrared spectral range" (NIR) while the range from 1.5μ to 15 μm is denoted as "mid infrared spectral range" (MidIR) and the range from 15 μm to 1000 μm as "far infrared spectral range" (FIR). Preferably, light used for the typical purposes of the present invention is light in the infrared (IR) spectral range, more preferred, in the near infrared (NIR) and the mid infrared spectral range (MidIR), especially the light having a wavelength of 1 μm to 5 μm, preferably of 1 μm to 3 μm.

The spectrometer device comprises a filter element configured for separating incident light into a spectrum of constituent wavelength signals whose respective intensities are determined by employing at least one optical sensor and/or at least one detector array. As used herein, the term "filter element" refers to an optical element which is adapted for separating incident light into the spectrum of constituent wavelength signals. For example, the filter element may be or may comprise at least one prism. For example, the filter element may be and/or may comprise at least one optical filter such as a length variable filter, i.e. an optical filter which comprises a plurality of filters, preferably a plurality of interference filters, which may, in particular, be provided in a continuous arrangement of the filters. Herein, each of the filters may form a bandpass with a variable center wavelength for each spatial position on the filter, preferably continuously, along a single dimension, which is, usually, denoted by the term "length", on a receiving surface of the length variable filter. In a preferred example, the variable center wavelength may be a linear function of the spatial position on the filter, in which case the length variable filter is usually referred to as a "linearly variable filter" or by its abbreviation "LVF". However, other kinds of functions may be applicable to the relationship between the variable center wavelength and the spatial position on the filter. Herein, the filters may be located on a transparent substrate which may, in particular, comprise at least one material that may show a high degree of optical transparency within in the visual and/or infrared (IR) spectral range, especially, within the near-infrared (NIR) spectral range as described below in more detail, whereby varying spectral properties, especially continuously varying spectral properties, of the filter along length of the filter may be achieved. In particular, the filter element may be a wedge filter that may be adapted to carry at least one response coating on a transparent substrate, wherein the response coating may exhibit a spatially variable property, in particular, a spatially variable thickness. However, other kinds of length variable filters which may comprise other materials or which may exhibit a further spatially variable property may also be feasible. At a normal angle of incidence of an incident light beam, each of the filters as comprised by the length variable filter may have a bandpass width that may amount to a fraction of the center wavelength, typically to a few percent, of the particular filter. By way of example, for a length variable filter having a wavelength range from 1400 to 1700 nm and a bandpass width of 1%, the bandpass width at the normal incidence angle might vary from 14 nm to 17 nm. However, other examples may also be feasible. As a result of this particular set-up of the length variable filter, only incident light having a wavelength which may, within a tolerance indicated by the bandpass width, equal the center wavelength being assigned to a particular spatial position on the filter is able to pass through the length variable filter at the particular spatial position. Thus, a "transmitting wavelength" which may be equal to the center wavelength ±½ of the bandpass width may be defined for each spatial position on the length variable filter. In other words, all light which may not pass through the length variable filter at the transmitting wavelength may be absorbed or, mostly, reflected by the receiving surface of the length variable filter. As a result, the length variable filter has a varying transmittance which may enable it for separating the incident light into a spectrum.

The spectrometer device comprises at least one optical sensor and/or at least one detector array comprising a plurality of pixelated optical sensors. For example, the spectrometer device may comprise the at least one prism and one optical sensor. For example, the spectrometer device may comprise the optical filter in combination with the detector array. Each of the pixelated optical sensors is adapted to receive at least a portion of one of the constituent wavelength signals. Each of the constituent wavelength signals is related to an intensity of each constituent wavelength. The light which may pass through the filter element at a particular spatial position on the filter element may, subsequently, impinge on the detector array. In other words, the detector array may, preferably, be placed in a manner that the light may first impinge on the filter element and only that the partition of the light which may pass through the particular spatial position on the filter element may, thereafter, be capable of impinging on a corresponding spatial position on the detector array. As a result, the filter element may, therefore, be used for separating the incident light by its associated wavelength or wavelengths into at least one corresponding spatial position while a particular optical sensor comprised by the detector array may, consequently, be employed for measuring an intensity of the incident light which, due to its particular wavelength, may be able to pass through the filter element at the corresponding spatial position and, therefore, impinge the particular optical sensors provided for determining the intensity of the incident light at the particular wavelength. In a particularly preferred embodiment, the detector array may, thus, comprise a sequence of optical sensor which may be located in form of a series of optical sensors one following the other, wherein the sequence of the optical sensors may be placed in a parallel manner with respect to the continuous arrangement of the interference filters along the length of the filter element.

The detector array may, thus, comprise a series of optical sensors which may, preferably, be arranged in a single line as a one-dimensional matrix along the length of the length variable filter or in more than one line, especially as two, three, or four lines parallel lines, in form of a two-dimensional matrix, in particular, in order to receive most of the intensity of the incident light as possible. Thus, a number N of pixels in one direction may be higher compared to a number M of pixels in a further direction such that the one-dimensional 1×N matrix or a rectangular two-dimensional M×N matrix may be obtained, wherein M<10 and N≥10, preferably N≥20, more preferred N≥50. In addition, the matrixes used herein may also be placed in a staggered arrangement. Herein, each of the optical sensors as used therein may have the same or, within a tolerance level, a similar optical sensitivity, especially for ease of manufacturing the series of the optical sensors. However, other kinds of arrangements may also be feasible.

In particular, in order to achieve a high resolution of the spectrometer device, each of the optical sensors may, thus, be adapted to receive incident light only over a small spatial angle. This arrangement, particularly, reflects the setup of the filter element which is designed to generate the desired spectrum depending on the spatial position of the impingement of the incident light along the length of the filter. This particular arrangement is, according to the present invention, achieved by a detector array which, thus, comprises a plurality of pixelated optical sensors, wherein each of the pixelated optical sensors is adapted to receive at least a portion of one of the constituent wavelength signals as provided by the length variable filter. As indicated above, each of the constituent wavelength signals is, hereby, related to an intensity of each of the constituent wavelengths. As generally used, the terms "pixelated optical sensor" or, simply, "pixelated optical sensor" refers to an optical sensor which comprises an array of individual pixel sensors, wherein each of the individual pixel sensors has at least a photosensitive area which is adapted for generating an electrical signal depending on the intensity of the incident light, wherein the electrical signal may, in particular, be provided to an external evaluation unit for further evaluation. Herein, the photosensitive area as comprised by each of the individual pixel sensors may, especially, be a single, uniform photosensitive area which is configured for receiving the incident light which impinges on the individual pixel sensor. However, other arrangements of the pixelated optical sensors may also be conceivable.

The pixelated optical sensor is designed to generate signals, preferably electronic signals, associated with the intensity of the incident light which impinges on the individual pixelated optical sensor. The signal may be an analogue and/or a digital signal. The electronic signals for adjacent pixelated optical sensors can, accordingly, be generated simultaneously or else in a temporally successive manner. By way of example, during a row scan or line scan, it is possible to generate a sequence of electronic signals which correspond to the series of the individual pixel sensors which are arranged in a line. In addition, the individual pixel sensors may, preferably, be active pixel sensors which may be adapted to amplify the electronic signals prior to providing it to the external evaluation unit. For this purpose, the pixelated optical sensor may comprise one or more signal processing devices, such as one or more filters and/or analogue-digital-converters for processing and/or preprocessing the electronic signals.

The pixelated optical sensor may be selected from any known pixel sensor, in particular, from a pixelated organic camera element, preferably, a pixelated organic camera chip, or from a pixelated inorganic camera element, preferably, a pixelated inorganic camera chip, more preferably from a CCD chip or a CMOS chip, which are, commonly, used in various cameras nowadays. As an alternative, the pixelated optical sensor may be or comprise a photoconductor, in particular an inorganic photoconductor, especially PbS, PbSe, Ge, InGaAs, ext. InGaAs, InSb, or HgCdTe. As a further alternative it may comprise of pyroelectric, bolometer or thermopile detector elements. Thus, a camera chip having a matrix of 1×N pixels or of M×N pixels may be used here, wherein M<10 and N≥10, preferably N≥20, more preferred N≥50. Further, a mono-chrome camera element, preferably a monochrome camera chip, may be used, wherein the monochrome camera element may be differently selected for each pixel sensor, especially, in accordance with the varying wavelength along the series of the optical sensors.

As a further alternative, the pixelated optical sensor may be based on a FiP sensor which is, among further documents, disclosed in WO 2012/110924 A1, WO 2014/097181 A1, or WO 2016/120392 A1. Herein, the term "FiP sensor" refers to a sensor in which the sensor signal, given the same total power of the illumination, is, according to the so called "FiP effect", dependent on a geometry of the illumination of the photosensitive area, in particular on a beam cross-section of the illumination on the photosensitive area, also denoted as a "spot size". As a result, the observable property that an electrical property of the photosensitive area depends on an extent of the illumination of the photosensitive area by incident light particularly accomplishes that two incident light beams comprising the same total power but generating different spot sizes on the photosensitive area provide different values for the electrical property of the photosensitive area and are, thus, distinguishable with respect to each other. Preferably, the photosensitive area of each of the FiP sensors may comprise a photoconductive material, especially selected from PbS, PbSe, or HgCdTe, or a solid dye sensitized solar cell (sDSC). Further, WO 2014/198625 A1 discloses a particular embodiment of a detector array which employs a M×N matrix of FiP sensors. Alternatively, further kinds of pixelated optical sensors may also be feasible.

Thus, the detector array may be adapted to provide a plurality of the electrical signals which may be generated by the photosensitive areas of the pixelated optical sensors comprised by the detector array. The electrical signals as provided by the detector array of the spectrometer device may, subsequently, be forwarded to an evaluation device. Herein, the term "evaluation device" refers to an apparatus being designated for determining information related to the spectrum of the object of which a spectrum has been recorded, in particular, by using the spectrometer device as described herein, wherein the information is obtainable by evaluating the detector signals as provided by the detector array of the spectrometer device. The information may, for example, be provided electronically, visually, acoustically or in any arbitrary combination thereof. Further, the information may be stored in a data storage device of the spectrometer device or of a separate storage device and/or may be provided via at least one interface, such as a wireless interface and/or a wire-bound interface.

The spectrometer device may comprise at least one concentrator device, also denoted light concentrator, for directing the light beam to the filter element. As generally used, the term "concentrator device" refers to a non-imaging optical element having an input, also denoted as "entrance pupil" or "entrance aperture, an output located oppositely to the input, wherein the output may also be denoted by one of the terms "exit pupil" or "exit aperture", and an optically guiding structure located between the input and the output, wherein the concentrator device is, in normal direction of operation, adapted for capturing light at the input at a large angular spread, concentrating the captured light within the optically guiding structure, and emitting the concentrated light at the output. In the spectrometer device, the concentrator device may be used in a reversed operation mode, wherein the entrance pupil facing towards the object may be the smaller aperture of concentrator device, in order to capture only the light from the object, wherein the exit pupil facing the optical detector and/or sensor array may be the larger aperture of the concentrator device in order to distribute all of the collected light onto the optical detector or sensor array. By way of example, the optical concentrator may, therefore, be used in concentrated photovoltaics in order to allow high solar concentration under large possible entrance angles. For example, the concentrator device may be selected from the group selected of: at least one tapered or conic light concentrator, a compound parabolic concentrator, a compound elliptical concentrator, and a compound hyperbolic concentrator.

In addition, the spectrometer device according to the present invention may, further, comprise at least one transfer device. The light beam which emerges from the object may travel firstly through the transfer device until it may, subsequently, pass the filter element until it may, finally, impinge the detector array. As used herein, the term "transfer device" may, thus, refer to an optical component which can be configured to transfer the light beam emerging from the inversely-operated optical concentrator device to the detector array. In a particular embodiment, the transfer device can, thus, be designed to shape the light beam before it may be guided to the length variable filter. Particularly, the transfer device may be selected from a group consisting of an optical lens, a curved mirror, a grating, and a diffractive optical element. More particular, the optical lens may, especially, be selected from a group consisting of a biconvex lens, a plano-convex lens, a biconcave lens, a plano-concave lens, an aspherical lens, a cylindrical lens and a meniscus lens. Hereby, the transfer device may comprise a material which may be at least partially transparent, preferably over the whole wavelength range of the filter element as indicated above. For this purpose, the same or similar optically transparent materials as mentioned in this respect can also be used. However, further optical elements may also be feasible.

The spectrometer device is configured for determining at least one distance information about a distance between at least one object and the spectrometer device. The spectrometer device may be adapted for determining the distance information and the information related to the spectrum of the object simultaneously or subsequently.

The "object" may, generally, be a sample or an arbitrary body, chosen from a living object and a non-living object. Thus, as an example, the at least one object may comprise one or more articles and/or one or more parts of an article, wherein the at least one article or the at least one part thereof may comprise at least one component which may provide a spectrum suitable for investigations. Additionally or alternatively, the object may be or may comprise one or more living beings and/or one or more parts thereof, such as one or more body parts of a human being, e.g. a user, and/or an animal.

Light emerging from the object can originate in the object itself, but can also optionally have a different origin and propagate from this origin to the object and subsequently toward the spectrometer device. The latter case can, in particular, be affected by at least one illumination source being used. Thus, the light propagating from the object to the spectrometer device may be light which may be reflected and/or scattered by the object and/or a reflection device connected to the object. Alternatively or in addition, the light may at least partially transmit through the object.

The spectrometer device may comprise at least one illumination source. As used herein, the term "illumination source" refers to an arbitrary device adapted to generate and/or to provide at least one light beam for illumination of the object. The illumination source can be embodied in various ways. Thus, the illumination source can be for example part of the spectrometer device in a housing. Alternatively or additionally, however, the at least one illumination source can also be arranged outside a housing, for example as a separate light source. The illumination source can be arranged separately from the object and illuminate the object from a distance. As indicated above, the illumination source can, alternatively or in addition, also be connected to the object or be part of the object, such that, by way of example, the electromagnetic radiation emerging from the object can also be generated directly by the illumination source. By way of example, at least one illumination source can be arranged on and/or in the object and directly generate the electromagnetic radiation.

The illumination source may, preferably, comprise a kind of illumination source which may be known to provide sufficient emission in visual spectral range and/or in the infrared (IR) spectral range, especially, in the near infrared (NIR) spectral range, in particular, an incandescent lamp. Alternatively or in addition, the illumination source may, be selected from at least one of the following illumination sources: a laser, in particular a laser diode, although further types of lasers can also be used; a light emitting diode; an organic light source, in particular an organic light emitting diode; a neon light; a structured light source; a flame source; a heat source. Alternatively or additionally, other illumination sources can be used. Herein, it may particularly be preferred when the light emitted by the object and/or by the illumination source may exhibit a spectral range which may be closely related to the spectral sensitivities of the detector array, particularly, in a manner to ensure that the detector array which may be illuminated by the respective illumination source may be capable of providing a detector signal having a high intensity, thus, enabling an evaluation of the detector signals with sufficient signal-to-noise-ratio and, concurrently, a high-resolution.

The spectrometer device may constitute a coordinate system, wherein a longitudinal coordinate is a coordinate along an optical axis of the spectrometer device. The coordinate system may be a polar coordinate system in which the optical axis of the spectrometer device forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate or distance. Any direction perpendicular to the z-axis may be considered a transversal direction, and the polar coordinate and/or the polar angle may be considered a transversal coordinate. As used herein, the term "distance information" refers to information about the longitudinal coordinate of the object and/or a distance value between spectrometer device and the object. As used herein, the term "determining at least one distance information" refers to obtaining and/or measuring and/or deriving and/or estimating the distance information. The distance between the object and the spectrometer device may be obtained by using one or more of: depth-from-photon-ratio, structured light, beam profile analysis, time-of-flight, shape-from-motion, depth-from-focus, triangulation, depth-from-defocus, stereo sensors. Furthermore, the distance information may be obtained using at least one FiP sensor as described in WO 2012/110924 A1 or WO 2014/097181 A1. The spectrometer device may comprise at least one distance detector configured for determining the distance between the object and the spectrometer device based on triangulation principle, such as at least one triangulation proximity sensor. The spectrometer device may comprise at least one time-of-flight sensor. For example, at least one of the optical sensors may be adapted to generate at least one sensor signal dependent on a time-of-flight (TOF) the illumination light beam has traveled from the illumination source to the object and a reflection light beam has traveled from the object to the time-of-flight sensor. The time-of-flight sensor may be selected from the group consisting of: at least one pulsed time-of-flight detector; at least one phase modulated time-of-flight detector; at least one direct time-of-flight detector; at least one indirect time-of-flight detector. For example, the pulsed time-of-flight detector may be at least one range gated imager and/or at least one direct time-of-flight imager. For example the phase modulated time-of-flight detector may be at least one RF-modulated light source with at least one phase detector. The time-of-flight sensor may be adapted to determine a time delay between emission of the illumination light beam by the illumination source and receipt of the reflection light beam.

The spectrometer device may be adapted to perform the determination of the distance information, such as the longitudinal coordinate, before and/or during and/or after the spectroscopic measurement.

Preferably, the spectrometer device may be adapted to determine the position based on the depth-from-photon-ratio technique. With respect to details of methods and devices based on the depth-from-photon-ratio technique reference is made to international patent applications number PCT/EP2017/079577, PCT/EP2017/079558, PCT/EP2017/079564 filed on Nov. 17, 2017 and PCT/EP2018/056545 filed on Mar. 15, 2018 the full content of which is included by reference. Depth-from-photon-ratio is a distance measurement technology that is very flexible concerning the detector technology and, thus, also very flexible concerning the wavelength of the employed light source. Known mobile spectrometer technologies use silicon, InAs, InGaAs, or extended InGaAs detectors, wherein silicon is very limited in its wavelength regime and both InAs and InGaAs are expensive. Lead salt detectors show promise for mobile applications due to novel encapsulation technologies allowing compact sensor designs, see e.g. WO 2018/019921 A1. Using depth-from-photon-ratio may allows reliable distance measurement and easy implementation in a spectrometer with little additional effort.

Thus, in a preferred embodiment, the spectrometer device comprises
- at least one filter element adapted to separate at least one incident light beam into a spectrum of constituent wavelength;
- at least one sensor element having a matrix of optical sensors, the optical sensors each having a light-sensitive area, wherein each optical sensor is configured to generate at least one sensor signal in response to an illumination of the light-sensitive area by at least one light beam propagating from at least one object to the spectrometer, wherein at least one first optical sensor of the optical sensors is adapted to generate a first sensor signal in response to illumination by a first constituent wavelength and wherein at least one second optical sensor of the optical sensors is adapted to generate a second sensor signal in response to an illumination by the first constituent wavelength;
- at least one evaluation device configured for determining at least one longitudinal coordinate z of the object by evaluating a combined signal Q from the first sensor signal and the second sensor signal, wherein the evaluation device is configured for evaluating at least one sensor signal generated by the optical sensors of the matrix of optical sensor by performing at least one spectroscopic analysis considering the determined longitudinal coordinate z.

As used herein, an "optical sensor" generally refers to a light-sensitive device for detecting a light beam, such as for detecting an illumination and/or a light spot generated by at least one light beam. As further used herein, a "light-sensitive area" generally refers to an area of the optical sensor which may be illuminated externally, by the at least one light beam, in response to which illumination at least one sensor signal is generated. The light-sensitive area may specifically be located on a surface of the respective optical sensor. Other embodiments, however, are feasible. The spectrometer device may comprise a plurality of optical sensors each having a light sensitive area. As used herein, the term "the optical sensors each having at least one light sensitive area" refers to configurations with a plurality of single optical sensors each having one light sensitive area and to configurations with one combined optical sensor having a plurality of light sensitive areas. The term "optical sensor" furthermore refers to a light-sensitive device configured to generate one output signal. In case the spectrometer device comprises a plurality of optical sensors, each optical sensor may be embodied such that precisely one light-sensitive area is present in the respective optical sensor, such as by providing precisely one light-sensitive area which may be illuminated, in response to which illumination precisely one uniform sensor signal is created for the whole optical sensor. Thus, each optical sensor may be a single area optical sensor. The use of the single area optical sensors, however, renders the setup of the detector specifically simple and efficient. Thus, as an example, commercially available pho-to-sensors, such as commercially available silicon photodiodes, each having precisely one sensitive area, may be used in the set-up. Other embodiments, however, are feasible. The optical sensors may be part of or constitute a pixelated optical device. For example, the optical sensor may be and/or may comprise at least one CCD and/or CMOS device. As an example, the optical sensors may be part of or constitute at least one CCD and/or CMOS device having a matrix of pixels, each pixel forming a light-sensitive area.

The optical sensors of the sensor element and the optical sensors used for spectroscopy may be identical. Specifically, the optical sensors of the sensor element may be used as optical sensors for spectroscopy or the other was round. Thus, the optical sensors of the sensor element may correspond to or may be designed as the optical sensors for spectroscopy and/or the matrix of optical sensors of the sensor element may correspond to or may be designed as detector array.

The optical sensors specifically may be or may comprise at least one photodetector, preferably inorganic photodetectors, more preferably inorganic semiconductor photodetectors, most preferably silicon photodetectors. Specifically, the optical sensors may be sensitive in the infrared spectral range. All pixels of the matrix or at least a group of the optical sensors of the matrix specifically may be identical. Groups of identical pixels of the matrix specifically may be provided for different spectral ranges, or all pixels may be identical in terms of spectral sensitivity. Further, the pixels may be identical in size and/or with regard to their electronic or optoelectronic properties. Specifically, the optical sensors may be or may comprise at least one inorganic photodiode which are sensitive in the infrared spectral range, preferably in the range of 700 nm to 3.0 micrometers. Specifically, the optical sensors may be sensitive in the part of the near infrared region where silicon photodiodes are applicable specifically in the range of 700 nm to 1100 nm. Infrared optical sensors which may be used for optical sensors may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one photoconductive sensor such as a PbS or PbSe sensor, a bolometer, preferably a bolometer selected from the group consisting of a VO bolometer and an amorphous Si bolometer.

The matrix may be composed of independent pixels such as of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the optical sensor may be and/or may comprise at least one CCD and/or CMOS device and/or the optical sensors of the detector may form a sensor array or may be part of a sensor array, such as the above-mentioned matrix. Thus, as an example, the optical sensors may comprise and/or constitute an array of pixels, such as a rectangular array, having m rows and n columns, with m, n, independently, being positive integers. For example, the sensor element may comprise at least two optical sensors arranged in a row and or column such as a bi-cell. For example, the sensor element may a quadrant diode system comprising a 2×2 matrix of optical sensors. For example, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular. As used herein, the term "essentially perpendicular" refers to the condition of a perpendicular orientation, with a tolerance of e.g. ±20° or less, preferably a tolerance of ±10° or less, more preferably a tolerance of ±5° or less. Similarly, the term "essentially parallel" refers to the condition of a parallel orientation, with a tolerance of e.g. ±20° or less, preferably a tolerance of ±10° or less, more preferably a tolerance of ±5° or less. Thus, as an example, tolerances of less than 20°, specifically less than 10° or even less than 5°, may be acceptable. In order to provide a wide range of view, the matrix specifically may have at least 10 rows, preferably at least 500 rows, more preferably at least 1000 rows. Similarly, the matrix may have at least 10 columns, preferably at least 500 columns, more preferably at least 1000 columns. The matrix may comprise at least 50 optical sensors, preferably at least 100000 optical sensors, more preferably at least 5000000 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred.

Preferably, the light sensitive area may be oriented essentially perpendicular to an optical axis of the spectrometer device. The optical axis may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

For determining a longitudinal coordinate of the object using depth-from-photon-ratio technology at least two optical sensors may be employed. As outlined above, for obtaining the distance information the spectrometer comprises at least one optical sensor and/or a plurality of optical sensors. Specifically, for spectroscopy, one optical sensor in combination with a prism or several optical sensors in combination with an optical filer may be employed. For example, one of the optical sensors used for determining a longitudinal coordinate of the object using depth-from-photon-ratio technology may be employed for spectroscopy. For example, the detector array used for spectroscopy may be used for determining a longitudinal coordinate of the object using depth-from-photon-ratio technology, too. Thus, using depth-fromphoton-ratio may allow reliable distance measurement and easy implementation in a spectrometer with little additional effort.

As used herein, a "sensor signal" generally refers to a signal generated by the optical sensor and/or at least one pixel of the optical sensor in response to illumination. Specifically, the sensor signal may be or may comprise at least one electrical signal, such as at least one analogue electrical signal and/or at least one digital electrical signal. More specifically, the sensor signal may be or may comprise at least one voltage signal and/or at least one current signal. More specifically, the sensor signal may comprise at least one photocurrent. Further, either raw sensor signals may be used, or the detector, the optical sensor or any other element may be adapted to process or preprocess the sensor signal, thereby generating secondary sensor signals, which may also be used as sensor signals, such as preprocessing by filtering or the like. The terms "first" and "second" sensor signal and constituent wavelength are used as names and give no indication of an order or whether further sensor signals and constituent wavelength are used. Each optical sensor of the matrix of optical sensors may be configured to generate at least one sensor signal in response to an illumination of the light-sensitive area by at least one light beam, in particular having one constituent wavelength, propagating from at least one object to the spectrometer. The first optical sensor of the optical sensors is adapted to generate a first sensor signal in response to illumination by a first constituent wavelength and wherein at least one second optical sensor of the optical sensors is adapted to generate a second sensor signal in response to an illumination by the first constituent wavelength.

As outlined above, the evaluation device may be adapted to evaluate the combined signal. Thereby, the at least one longitudinal coordinate of the object is determined. As used herein, the term "longitudinal coordinate of the object" refers to a distance between the matrix of optical sensors and the object. The evaluating may comprises evaluating the combined signal from the first sensor signal and the second sensor signal. As used herein, the term "combined signal" refers to a signal which is generated by combining at least two sensor signals, in particular by one or more of dividing the sensor signals, dividing multiples of the sensor signals or dividing linear combinations of the sensor signals. The evaluation device may be configured for deriving the combined signal by one or more of dividing the sensor signals, dividing multiples of the sensor signals, dividing linear combinations of the sensor signals. The evaluation device may be configured for using at least one predetermined relationship between the combined signal and the longitudinal coordinate for determining the longitudinal coordinate. The predetermined relationship may be one or more of an empiric relationship, a semi-empiric relationship and an analytically derived relationship. The evaluation device may comprise at least one data storage device for storing the predetermined relationship, such as a lookup list or a lookup table.

The combined signal may be determined by using various means. As an example, a software means for deriving a quotient signal, a hardware means for deriving the quotient signal, or both, may be used and may be implemented in the evaluation device. Thus, the evaluation device, as an example, may comprise at least one divider, wherein the divider is configured for deriving the quotient signal. The divider may fully or partially be embodied as one or both of a software divider or a hardware divider. The divider may fully or partially be integrated into the sensor element answers or may fully or partially be embodied independent from the sensor element.

For example, the combined signal Q, are derived by $$Q(z_o) = \frac{\int\int_{A_1} E(x, y, z_o) dx dy}{\int\int_{A_2} E(x, y, z_o) dx dy}$$

wherein x and y are transversal coordinates, A1 and A2 are different areas of the at least one beam profile at the position of the sensor element, and $E(x,y,z_o)$ denotes a beam profile given at the distance $z_o$. As used herein, the term "beam profile" refers to at least one intensity distribution of a light spot on the optical sensor as a function of the pixel. The beam profile may be selected from the group consisting of a trapezoid beam profile; a triangle beam profile; a conical beam profile and a linear combination of Gaussian beam profiles.

Area A1 and area A2 may differ. In particular, A1 and A2 are not congruent. Thus, A1 and A2 may differ in one or more of the shape or content. Each of the sensor signals may comprises at least one information of at least one area of the beam profile. Generally the beam profile is dependent on luminance $L(z_o)$ and beam shape $S(x,y;z_o)$, $E(x,y;z_o)=L\cdot S$. Thus, by deriving the combined signal it may allow determining the longitudinal coordinate independent from luminance. In addition, using the combined signal allows determination of the distance $z_o$ independent from an object size. Thus, the combined signal allows determination of the distance $z_o$ independent from the material properties and/or reflective properties and/or scattering properties of the object to be measured and independent from alterations of the light source such as by manufacturing precision, heat, water, dirt, damages on the lens, or the like.

Each of the first sensor signal and the second sensor signal may comprise at least one information of the at least one area of the beam profile. The light-sensitive areas may be arranged such that one of the sensor signals comprises information of a first area of the beam profile and the other one of the sensor signals comprises information of a second area of the beam profile. The first area of the beam profile and the second area of the beam profile may be one or both of adjacent or overlapping regions. The first area and the second area may be not congruent in area. The first area of the beam profile may comprise essentially edge information of the beam profile and the second area of the beam profile may comprise essentially center information of the beam profile. The edge information may comprise information relating to a number of photons in the first area of the beam profile and the center information comprises information relating to a number of photons in the second area of the beam profile. The evaluation device may be configured to determine and/or to select the first area of the beam profile and the second area of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. As used herein, the term "essentially center information" generally refers to a low proportion of edge information, i.e. proportion of the intensity distribution corresponding to edges, compared to a proportion of the center information, i.e. proportion of the intensity distribution corresponding to the center. Preferably the center information has a proportion of edge information of less than 10%, more preferably of less than 5%, most preferably the center information comprises no edge content. As used herein, the term "essentially edge information" generally refers to a low proportion of center information compared to a proportion of the edge information. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A1 and the second area of the beam profile may be area A2.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device may be adapted for determining an area integral of the beam profile. The evaluation device may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Additionally or alternatively, the evaluation device may be adapted to determine one or both of center information or edge information from at least one slice or cut of the light spot. This may be realized, for example, by replacing the area integrals in the combined signal by a line integral along the slice or cut. For improved accuracy, several slices or cuts through the light spot may be used and averaged. In case of an elliptical spot profile, averaging over several slices or cuts may result in improved distance information.

The evaluation device may be configured to derive the combined signal by one or more of dividing the respective edge information and the respective center information, dividing multiples of the respective edge information and the respective center information, dividing linear combinations of the respective edge information and the respective center information. Thus, essentially, photon ratios may be used as the physical basis of the depth-from-photon-ratio technique.

As explained, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the sensor element. Without wishing to be bound by this theory, the light spot may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object and the sensor element. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the location of reflection may be generated. The comparing of the center signal and the sum signal, as an example, may be done by forming the combined signal Q out of the center signal and the sum signal and by using a predetermined or determinable relationship between the longitudinal coordinate and the combined signal for deriving the longitudinal coordinate.

The light beam impinging on the optical sensor may fully illuminate the at least one optical sensor from which the center signal is generated, such that the at least one optical sensor from which the center signal arises is fully located within the light beam, with a width of the light beam being larger than the light-sensitive area of the at least one optical sensor from which the sensor signal arises. Contrarily, preferably, the light beam specifically may create a light spot on the entire matrix which is smaller than the matrix, such that the light spot is fully located within the matrix. This situation may easily be adjusted by a person skilled in the art of optics by choosing one or more appropriate lenses or elements having a focusing or defocusing effect on the light beam, such as by using an appropriate transfer device as will be outlined in further detail below. As further used herein, a "light spot" generally refers to a visible or detectable round or non-round illumination.

The combined signal Q may be derived by one or more of: forming a quotient of the first signal and the second signal or vice versa; forming a quotient of a multiple of the first signal and a multiple of the second signal or vice versa; forming a quotient of a linear combination of the first signal and a linear combination of the second signal or vice versa; forming a quotient of a first linear combination of the first signal and the second signal and a second linear combination of the first signal and the second signal. The evaluation device may be configured for using at least one predetermined relationship between the combined signal Q and the longitudinal coordinate z of the object for determining the longitudinal coordinate z. The evaluation device may comprise at least one divider, wherein the divider is configured for deriving the combined signal.

The evaluation device may be adapted to determine those optical sensors of the matrix of optical sensors illuminated by the first wavelength constituent. The evaluation device may be configured for determining the at least one optical sensor illuminated by the first constituent wavelength and having the highest sensor signal and forming the first sensor signal. The first sensor signal may be at least one center signal. The evaluation device may be configured for evaluating the sensor signals of the optical sensors of the matrix illuminated by the first wavelength constituent and forming the second sensor signal. The second sensor signal is at least one sum signal. The evaluation device may be configured for determining the combined signal Q by combining the center signal and the sum signal.

The term "center signal" generally refers to the at least one sensor signal comprising essentially center information of the beam profile. As used herein, the term "highest sensor signal" refers to one or both of a local maximum or a maximum in a region of interest. For example, the center signal may be the signal of the at least one optical sensor and/or pixel having the highest sensor signal out of the plurality of sensor signals generated by the optical sensors and/or pixels of the entire matrix or of a region of interest within the matrix, wherein the region of interest may be predetermined or determinable within an image generated by the optical sensors and/or pixels of the matrix. The center signal may arise from a single optical sensor and/or pixel or from a group of optical sensors, wherein, in the latter case, as an example, the sensor signals of the group of optical sensors and/or pixels may be added up, integrated or averaged, in order to determine the center signal. The group of optical sensors and/or pixels from which the center signal arises may be a group of neighboring optical sensors and/or pixels, such as optical sensors and/or pixels having less than a predetermined distance from the actual optical sensor and/or pixel having the highest sensor signal, or may be a group of optical sensors and/or pixels generating sensor signals being within a predetermined range from the highest sensor signal. The group of optical sensors and/or pixels from which the center signal arises may be chosen as large as possible in order to allow maximum dynamic range. The evaluation device may be adapted to determine the center signal by integration of the plurality of sensor signals, for example the plurality of optical sensors and/or pixels around the optical sensor and/or pixel having the highest sensor signal.

As outlined above, the center signal generally may be a single sensor signal, such as a sensor signal from the optical sensor and/or pixel in the center of the light spot, or may be a combination of a plurality of sensor signals, such as a combination of sensor signals arising from optical sensors and/or pixels in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors and/or pixels containing the optical sensor and/or pixel having the highest sensor signal and a predetermined group of neighboring optical sensors and/or pixels; a sum of sensor signals from a group of optical sensors and/or pixels containing the optical sensor and/or pixel having the highest sensor signal and a predetermined group of neighboring optical sensors and/or pixels; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Similarly, the term "sum signal" generally refers to a signal comprising essentially edge information of the beam profile. For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors of the matrix. When adding up, integrating over or averaging over the sensor signals, the actual optical sensors from which the sensor signal is generated may be left out of the adding, integration or averaging or, alternatively, may be included into the adding, integration or averaging. The evaluation device may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

Additionally or alternatively, the evaluation device may be adapted to determine one or both of center information or edge information from at least one slice or cut of the light spot. This may be realized for example by replacing the area integrals in the quotient by a line integral along the slice or cut. For improved accuracy, several slices or cuts through the light spot may be used and averaged. In case of an elliptical spot profile, averaging over several slices or cuts may result in an improved distance information.

The center signal is selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold. The sum signal is selected from the group consisting of: an average over all sensor signals of the matrix; a sum of all sensor signals of the matrix; an integral of all sensor signals of the matrix an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal.

The combined signal Q may be a signal which is generated by combining the center signal and the sum signal. Specifically, the determining may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal Q may comprise an arbitrary signal or signal combination which contains at least one item of information on a comparison between the center signal and the sum signal.

The spectrometer device is configured for determining at least one spectral or spectroscopic information of the at least one object. The spectrometer device comprises the at least one evaluation device configured for performing at least one spectroscopic analysis considering the determined distance information. The evaluation device may be configured for performing at least one spectroscopic analysis considering the determined longitudinal coordinate z. In the spectroscopic analysis at least one spectral or spectroscopic information of the object may be determined. Specifically, the evaluation device may be configured for determining light attenuation due to the distance between the object and the spectrometer device. As used herein, the term "light attenuation" refers to loss of intensity through travelled pathway of the light beam, i.e. the distance from the object to the spectrometer device, and/or presence of the object and/or ambient conditions. As used herein, the term "determining light attenuation" refers to approximating and/or measuring and/or deriving light attenuation. The spectroscopic analysis may comprise determining at least one difference in at least one light property due to presence of the object. The difference in the light property may be selected from the group consisting of: at least one wavelength dependent intensity difference; at least one wavelength dependent polarization difference. The evaluation device may be adapted to perform the spectroscopic analysis considering the light attenuation. The evaluation device may be adapted to correct intensities of the spectrum of constituent wavelength signals determined by the optical detector. Specifically, the evaluation device may be adapted to correct the determined intensity values for light attenuation, for example by multiplying and/or dividing the determined intensity values with at least one correction function. The correction function may be determined empirically and/or semi-empirically and/or analytically. For example, the spectrometer device may be configured for determining light attenuation by measuring a background spectrum depending on optics, light source, characteristics of light sources, dirt and the like. and to derive the correction function, such as a background correction function, therefrom. However, during measuring of the background spectrum the distance between object and spectrometer may be kept fixed. The spectrometer device may be a mobile spectrometer device. Specifically, the distance between the object and the spectrometer device may be variable. The evaluation device may be configured for determining alteration of the distance between the object and the spectrometer device. Thus, the intensity values and/or the background spectrum have to be corrected further for influences due to distance and alteration in distance between object and spectrometer device. The evaluation device may be adapted to correct the determined light attenuation for influences due to the distance between the object and the spectrometer. For correction of light attenuation due to distance a further correction function such as a polynomial correction function, for example a second order or higher order polynomial, may be used. For example, the distance dependent light attenuation may be corrected by a fraction of polynomials in z such as a polynomial up to third order in z divided by a polynomial up to fifth order in z, whereas coefficients may be used to adjust the distance dependent light attenuation function. For example, the correction function may be a rational polynomial function. For example, a polynomial $A \cdot 1/z^2$, with A being a coefficient or constant and z being the longitudinal coordinate z, may be used. The further correction function may be determined considering light emitting characteristics of the illumination source. In addition, the further correction function may be determined by considering per-determined reflection properties of the object, e.g. determined using spot profiles, and/or assumed reflection properties of the object. Further, the correction function may be a combined correction function correcting the light attenuation due to optics, ambient light, dirt, temperature, and correcting the distance dependent light attenuation simultaneously. As an example, the combined correction function may be a product of a distance independent correction function such as a background correction function and a distance dependent correction function.

The spectrometer device may be adapted to determine at least one further longitudinal coordinate of the object by evaluating the combined signal Q from a first sensor signal and a second sensor signal generated in response to a second constituent wavelength. The evaluation device may be adapted to determine a combined longitudinal coordinate from the longitudinal coordinate and the further longitudinal coordinate and to perform the spectroscopic analysis considering the combined longitudinal coordinate.

As further used herein, the term "evaluation device" generally refers to an arbitrary device adapted to perform the named operations, preferably by using at least one data processing device and, more preferably, by using at least one processor and/or at least one application-specific integrated circuit. Thus, as an example, the at least one evaluation device may comprise at least one data processing device having a software code stored thereon comprising a number of computer commands. The evaluation device may provide one or more hardware elements for performing one or more of the named operations and/or may provide one or more processors with software running thereon for performing one or more of the named operations.

The above-mentioned operations, including determining the longitudinal coordinate and performing the spectroscopic analysis, are performed by the at least one evaluation device. Thus, as an example, one or more of the above-mentioned relationships may be implemented in software and/or hardware, such as by implementing one or more lookup tables. Thus, as an example, the evaluation device may comprise one or more programmable devices such as one or more computers, application-specific integrated circuits (ASICs), Digital Signal Processors (DSPs), or Field Programmable Gate Arrays (FPGAs) which are configured to perform the above-mentioned evaluation. Additionally or alternatively, however, the evaluation device may also fully or partially be embodied by hardware.

The spectrometer device may be configured for contactless spectroscopy. Determining the distance information and using the distance information for correction of the spectroscopic measurement allows for variable distances between the object and the spectrometer device. Direct mechanical contact or use of special sample boxes can be avoided.

The evaluation device may be further configured for determining at least one transversal coordinate of the object by evaluating a transversal position of the at least one optical sensor having the highest sensor signal.

In one embodiment, the spectrometer device comprises the at least one filter element, wherein the filter element is configured for separating incident light into a spectrum of constituent wavelength signals whose respective intensities are determined by employing at least one optical sensor and/or at least one detector array. In this embodiment, the filter element is a linear variable filter. The spectrometer device may comprise the at least one tapered light concentrator. The spectrometer device furthermore may comprise at least two illumination sources, wherein each illumination source is configured to illuminate the object by generating and emitting the at least one illumination light beam. The illumination sources may be employed simultaneously or may be employed alternatingly for illumination of the object. The illumination light beam originating from one of the illumination sources may be reflected directly and/or may be scattered from the object. The direct reflection may not be directly distinguishable from the spectral information alone. The direct reflection may be distance dependent and may be less wavelength dependent than scattered light. The spectrometer device may be adapted to separate the direct reflection and the spectrum of the scattered light by recording at least two spectra at different object distances and/or by recording and comparing at least two spectra using the two light sources alternatingly. The spectrometer device may be adapted to record a spectrum using the two light sources simultaneously.

For example, the illumination sources may be employed alternatingly. For example, firstly, the illumination light beam originating e.g. from a first illumination source may be reflected directly and/or may be scattered from the object at a first distance and the optical sensors may be adapted to record at least one first spectrum. Subsequently, the illumination light beam originating from a second illumination source may be reflected directly and/or may be scattered from the object at the first distance and the optical sensors may be adapted to record at least one second spectrum. The order or sequence of using the illumination sources is described exemplary only such that other orders of using the illumination sources are possible such as firstly using the second illumination source and subsequently the first illumination source and/or repetitive usage of one or both illumination sources. The spectrometer device is configured for determining at least one distance information about a distance between the at least one object and the spectrometer device. By comparing the first spectrum and the second spectrum the evaluation device may be configured for determining at least two direct reflection peaks on the sensor element, specifically a first direct reflection peak originating from direct reflection from the object illuminated by the first illumination source and a second reflection peak originating from direct reflection from the object illuminated by the second illumination source. Specifically, the evaluation device may be configured to determine differences in the intensity distribution as a function of the wavelength, in particular peaks, by comparing the first and the second spectra. The location of the determined peak in the respective spectrum may correspond to a location on the matrix of optical sensors. The evaluation device may be adapted to determine a location at which the directly reflected light impinges on the matrix of optical sensors. For example, the evaluation device may be adapted to determine a location at which the directly reflected light originating from the object at the first distance illuminated by the first illumination source impinges on the matrix of optical sensors. The evaluation device may be adapted to determine a location at which the directly reflected light originating from the object at the first distance illuminated by the second illumination source impinges on the matrix of optical sensors. As outlined above, the direct reflection may be distance dependent and may be less wavelength dependent than scattered light. Once the locations on which the directly reflected light impinges on the matrix of optical sensors are known, triangulation algorithms can be used to determine the distance information about the first distance between the spectrometer device and the object. The evaluation device may be adapted to determine the first distance of the object by using at least one triangulation algorithm.

For example, the illumination sources may be employed simultaneously. The illumination light beam originating e.g. from the first illumination source may be reflected directly and/or may be scattered from the object at the first distance. The second illumination source may be employed for illuminating the object. The illumination light beam originating from the second illumination source may be reflected directly and/or may be scattered from the object at the first distance. The optical sensors may be adapted to record the at least one first spectrum of the received light for the object at the first distance. Recording of the spectrum is repeated for a second distance of the object. The illumination light beam originating e.g. from the first illumination source may be reflected directly and/or may be scattered from the object at the second distance. The illumination light beam originating from the second illumination source may be reflected directly and/or may be scattered from the object at the second distance. The optical sensors may be adapted to record the at least one first spectrum of the received light for the object at the second distance. By comparing the first spectrum and the second spectrum the evaluation device may be configured for determining at least four direct reflection peaks on the sensor element. Specifically, the evaluation device may be adapted to determine in the first spectrum a first direct reflection peak originating from direct reflection from the object illuminated by the first illumination source and a second reflection peak originating from direct reflection from the object illuminated by the second illumination source. Specifically, the evaluation device may be adapted to determine in the second spectrum a third direct reflection peak originating from direct reflection from the object illuminated by the first illumination source and a fourth reflection peak originating from direct reflection from the object illuminated by the second illumination source. The evaluation device may be configured to determine differences in the intensity distribution as a function of the wavelength, in particular peaks, by comparing the first and the second spectra. The location of the determined peak in the respective spectrum may correspond to a location on the matrix of optical sensors. Specifically, the evaluation device may be adapted to determine the locations at which the directly reflected light impinges on the matrix of optical sensors. For example, the reflected light originates from the object at the first distance and the second distance and the evaluation device may be adapted to determine the location at which the directly reflected light originating from the object at the first distance illuminated by the first illumination source impinges on the matrix of optical sensors. The evaluation device may be adapted to determine the location at which the directly reflected light originating from the object at the first distance illuminated by the second illumination source impinges on the matrix of optical sensors. The evaluation device may be adapted to determine a location at which the directly reflected light originating from the object at the second distance illuminated by the first illumination source impinges on the matrix of optical sensors. The evaluation device may be adapted to determine a location at which the directly reflected light originating from the object at the first distance illuminated by the second illumination source impinges on the matrix of optical sensors. Once at least two locations corresponding to the same object distance of the locations at which the direct reflection impinges on the matrix are known, triangulation algorithms can be used to determine the distance information about the distance between the spectrometer device and the object. The evaluation device may be adapted to determine the distance to the object by using at least one triangulation algorithm.

In a further aspect, the present invention discloses a method for determining at least one difference in at least one light property of at least one light beam originating from at least one object. In the method, at least one spectrometer device according to the present invention, such as according to one or more of the embodiments referring to a spectrometer device as disclosed above or as disclosed in further detail below is used. Still, other types of spectrometer devices may be used. The method comprises the following method steps, wherein the method steps may be performed in the given order or may be performed in a different order. Further, one or more additional method steps may be present which are not listed. Further, one, more than one or even all of the method steps may be performed repeatedly.

The method steps are as follows:

separating at least one incident light beam into a spectrum of constituent wavelength by using at least one filter element of the spectrometer device;

illuminating at least one sensor element of the spectrometer device with at least one constituent wavelength of the light beam, the spectrometer device having a matrix of optical sensors, the optical sensors each having a light-sensitive area, wherein each optical sensor is generates at least one sensor signal in response to an illumination of the light-sensitive area, wherein at least one first optical sensor of the optical sensors generates a first sensor signal in response to illumination by a first constituent wavelength and wherein at least one second optical sensor of the optical sensors generates a second sensor signal in response to illumination by the first constituent wavelength;

determining at least one longitudinal coordinate z of the object by evaluating a combined signal Q from the first sensor signal and the second sensor signal and evaluating at least one sensor signal generated by the optical sensors of the matrix of optical sensor by performing at least one spectroscopic analysis considering the determined longitudinal coordinate z, thereby determining the at least one difference in the at least one light property of the at least one light beam originating from the at least one object.

For details, options and definitions, reference may be made to the spectrometer device as dis-cussed above. Thus, specifically, as outlined above, the method may comprise using the spectrometer device according to the present invention, such as according to one or more of the embodiments given above or given in further detail below.

Specifically, the evaluation of the first and second sensor signal may comprise deriving the combined signal Q by one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Further, the determination of the longitudinal coordinate may comprise evaluating the combined signal Q. The evaluation of the combined signal specifically may comprise using at least one predetermined relationship between the combined signal Q and the longitudinal coordinate, in order to determine the longitudinal coordinate.

In a further aspect of the present invention, use of the spectrometer device according to the present invention, such as according to one or more of the embodiments given above or given in further detail below, is proposed, for a purpose of use, selected from the group consisting of: an infrared detection application; a heat detection application; a thermometer application; a heat-seeking application; a flame-detection application; a fire-detection application; a smoke-detection application; a temperature sensing application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application.

Overall, in the context of the present invention, the following embodiments are regarded as preferred:

Embodiment 1

A spectrometer device comprising
at least one filter element adapted to separate at least one incident light beam into a spectrum of constituent wavelength;
at least one sensor element having a matrix of optical sensors, the optical sensors each having a light-sensitive area, wherein each optical sensor is configured to generate at least one sensor signal in response to an illumination of the light-sensitive area by at least one light beam propagating from at least one object to the spectrometer, wherein at least one first optical sensor of the optical sensors is adapted to generate a first sensor signal in response to illumination by a first constituent wavelength and wherein at least one second optical sensor of the optical sensors is adapted to generate a second sensor signal in response to an illumination by the first constituent wavelength;
at least one evaluation device configured for determining at least one longitudinal coordinate z of the object by evaluating a combined signal Q from the first sensor signal and the second sensor signal, wherein the evaluation device is configured for evaluating at least one sensor signal generated by the optical sensors of the matrix of optical sensor by performing at least one spectroscopic analysis considering the determined longitudinal coordinate z.

Embodiment 2

The spectrometer device according to the preceding embodiment, wherein the spectrometer device is a mobile spectrometer device.

Embodiment 3

The spectrometer device according to any one of the preceding embodiments, wherein the spectrometer device is configured for contactless spectroscopy.

Embodiment 4

The spectrometer device according to any one of the preceding embodiments, wherein the spectrometer device is configured such that a distance between the object and the spectrometer device is variable.

Embodiment 5

The spectrometer device according to the preceding embodiment, wherein the evaluation device is configured for determining alteration of the distance between the object and the spectrometer device.

Embodiment 6

The spectrometer device according to any one of the two preceding embodiments, wherein the evaluation device is adapted to determine light attenuation due to distance between the object and the spectrometer device from the determined longitudinal coordinate z of the object.

Embodiment 7

The spectrometer device according to the preceding embodiment, wherein the evaluation device is adapted to perform at least one spectroscopic analysis considering the light attenuation, wherein the evaluation device is adapted to correct intensities of the spectrum of constituent wavelength signals determined by the optical detector for light attenuation, such as by multiplying and/or dividing the determined intensity values with at least one correction function.

Embodiment 8

The spectrometer device according to the preceding embodiment, wherein the spectrometer device is configured for determining light attenuation by measuring a background spectrum depending on optics, light source, characteristics of light sources, dirt and the like, wherein the spectrometer device is configured for deriving the correction function, such as a background correction function, therefrom.

Embodiment 9

The spectrometer device according to the preceding embodiment, wherein the distance between the object and the spectrometer device is variable, wherein the evaluation device is configured for determining alteration of the distance between the object and the spectrometer device, wherein intensity values and/or background spectrum are corrected further for influences due to distance and alteration in distance between object and spectrometer device, wherein the evaluation device is adapted to correct the determined light attenuation for influences due to the distance between the object and the spectrometer, wherein for correction of light attenuation due to distance a further correction function such as a polynomial correction function, for example a second order or higher order polynomial, is used, wherein the distance dependent light attenuation is corrected by a fraction of polynomials in z such as a polynomial up to third order in z divided by a polynomial up to fifth order in z, wherein coefficients are used to adjust the distance dependent light attenuation function.

Embodiment 10

The spectrometer device according to any one of the preceding embodiments, wherein the spectroscopic analysis comprises determining at least one difference in at least one light property due to presence of the object, wherein the difference in the light property is selected from the group consisting of: at least one wavelength dependent intensity difference; at least one wavelength dependent polarization difference.

Embodiment 11

The spectrometer device according to any one of the preceding embodiments, wherein the combined signal Q is derived by one or more of: forming a quotient of the first signal and the second signal or vice versa; forming a quotient of a multiple of the first signal and a multiple of the second signal or vice versa; forming a quotient of a linear combination of the first signal and a linear combination of the second signal or vice versa; forming a quotient of a first linear combination of the first signal and the second signal and a second linear combination of the first signal and the second signal.

Embodiment 12

The spectrometer device according to any one of the preceding embodiments, wherein the evaluation device is configured for using at least one predetermined relationship between the combined signal Q and the longitudinal coordinate z of the object for determining the longitudinal coordinate z.

Embodiment 13

The spectrometer device according to any one of the preceding embodiments, wherein the evaluation device comprises at least one divider, wherein the divider is configured for deriving the combined signal.

Embodiment 14

The spectrometer device according to any one of the preceding embodiments, wherein the spectrometer device comprises at least one illumination source, wherein the illumination source is adapted to illuminate the object with at least one illumination light beam.

Embodiment 15

The spectrometer device according to the preceding embodiment, wherein the illumination source comprises an incandescent lamp.

Embodiment 16

The spectrometer device according to any one of the preceding embodiments, wherein the spectrometer device comprises at least one concentrator device for directing the light beam to the filter element.

Embodiment 17

The spectrometer device according to any one of the preceding embodiments, wherein the evaluation device is adapted to determine those optical sensors of the matrix of optical sensors illuminated by the first wavelength constituent.

Embodiment 18

The spectrometer device according to any one of the preceding embodiments, wherein the evaluation device is configured for determining the at least one optical sensor illuminated by the first constituent wavelength and having the highest sensor signal and forming the first sensor signal, wherein the first sensor signal is at least one center signal, wherein the evaluation device is configured for evaluating the sensor signals of the optical sensors of the matrix illuminated by the first wavelength constituent and forming the second sensor signal, wherein the second sensor signal is at least one sum signal, wherein the evaluation device is configured for determining the combined signal Q by combining the center signal and the sum signal Embodiment 19

The spectrometer device according to the preceding embodiment, wherein the center signal is selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold.

Embodiment 20

The spectrometer device according to any one of the two preceding embodiments, wherein the sum signal is selected from the group consisting of: an average over all sensor signals of the matrix; a sum of all sensor signals of the matrix; an integral of all sensor signals of the matrix an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; an integral of sensor signals above a certain threshold of optical sensors being located within a predetermined range from the optical sensor having the highest sensor signal.

Embodiment 21

The spectrometer device according to any one of the preceding embodiments, wherein the evaluation device is further configured for determining at least one transversal coordinate of the object by evaluating a transversal position of the at least one optical sensor having the highest sensor signal.

Embodiment 22

The spectrometer device according to any one of the preceding embodiments, wherein the spectrometer device is adapted to determine at least one further longitudinal coordinate of the object by evaluating the combined signal Q from a first sensor signal and a second sensor signal generated in response to a second constituent wavelength, wherein the evaluation device is adapted to determine a combined longitudinal coordinate from the longitudinal coordinate and the further longitudinal coordinate and to perform the spectroscopic analysis considering the combined longitudinal coordinate.

Embodiment 23

A spectrometer device, wherein the spectrometer device is configured for determining at least one spectral or spectroscopic information of at least one object, wherein the spectrometer device comprises at least one filter element configured for separating incident light into a spectrum of constituent wavelength signals whose respective intensities are determined by employing at least one optical sensor and/or at least one detector array, wherein the spectrometer device is configured for determining at least one distance information about a distance between at least one object and the spectrometer device, wherein the spectrometer device comprises at least one evaluation device configured for performing at least one spectroscopic analysis considering the determined distance information.

Embodiment 24

The spectrometer device according to the preceding embodiment, wherein the distance information is obtained by using one or more of: depth-from-photon-ratio, structured light, beam profile analysis, time-of-flight, shape-from-motion, depth-from-focus, triangulation, depth-from-defocus, stereo sensors.

Embodiment 25

The spectrometer device according to any one of the two preceding embodiments, wherein the spectrometer device comprises and/or is arranged as spectrometer device according to any one of embodiments 1 to 22.

Embodiment 26

The spectrometer device according to any one of the three preceding embodiments, wherein the filter element is a linear variable filter, wherein the spectrometer device comprises at least one tapered light concentrator.

Embodiment 27

The spectrometer device according to any one of the four preceding embodiments, wherein the spectrometer device comprises at least two illumination sources, wherein each illumination source is configured to illuminate object by generating and emitting the at least one illumination light beam, wherein the illumination sources are employed simultaneously or alternatingly for illumination of the object, wherein the spectrometer device is adapted to separate direct reflection and a spectrum of scattered light by recording at least two spectra at different object distances and/or by recording and comparing at least two spectra using the light sources alternatingly, wherein the evaluation device is adapted to determine the distance information by using at least one triangulation algorithm.

Embodiment 28

A method for determining at least one difference in at least one light property of at least one light beam originating from at least one object, wherein in the method a spectrometer device according to any one of the preceding embodiments referring to a spectrometer device is used, the method comprising the following steps:
 separating at least one incident light beam into a spectrum of constituent wavelength by using at least one filter element of the spectrometer device;
 illuminating at least one sensor element of the spectrometer device with at least one constituent wavelength of the light beam, the spectrometer device having a matrix of optical sensors, the optical sensors each having a light-sensitive area, wherein each optical sensor is generates at least one sensor signal in response to an illumination of the light-sensitive area, wherein at least one first optical sensor of the optical sensors generates a first sensor signal in response to illumination by a first constituent wavelength and wherein at least one second optical sensor of the optical sensors generates a second sensor signal in response to illumination by the first constituent wavelength;
 determining at least one longitudinal coordinate z of the object by evaluating a combined signal Q from the first sensor signal and the second sensor signal and evaluating at least one sensor signal generated by the optical sensors of the matrix of optical sensor by performing at least one spectroscopic analysis considering the determined longitudinal coordinate z, thereby determining the at least one difference in the at least one light property of the at least one light beam originating from the at least one object.

Embodiment 29

The method according to the preceding embodiment, wherein the evaluation is performed using at least one evaluation device.

Embodiment 30

The use of a spectrometer device according to any one of the preceding embodiments referring to a spectrometer device for a purpose of use, selected from the group consisting of: an infrared detection application; a heat detection application; a thermometer application; a heat-seeking application; a flame-detection application; a fire-detection application; a smoke-detection application; a temperature sensing application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application.

BRIEF DESCRIPTION OF THE FIGURES

Further optional details and features of the invention are evident from the description of preferred exemplary embodiments which follows in conjunction with the dependent claims. In this context, the particular features may be implemented in an isolated fashion or in combination with other features. The invention is not restricted to the exemplary embodiments. The exemplary embodiments are shown schematically in the figures. Identical reference numerals in the individual figures refer to identical elements or elements with identical function, or elements which correspond to one another with regard to their functions.

Specifically, in the figures.

DETAILED DESCRIPTION OF THE EMBODIMENTS

Figure 1:
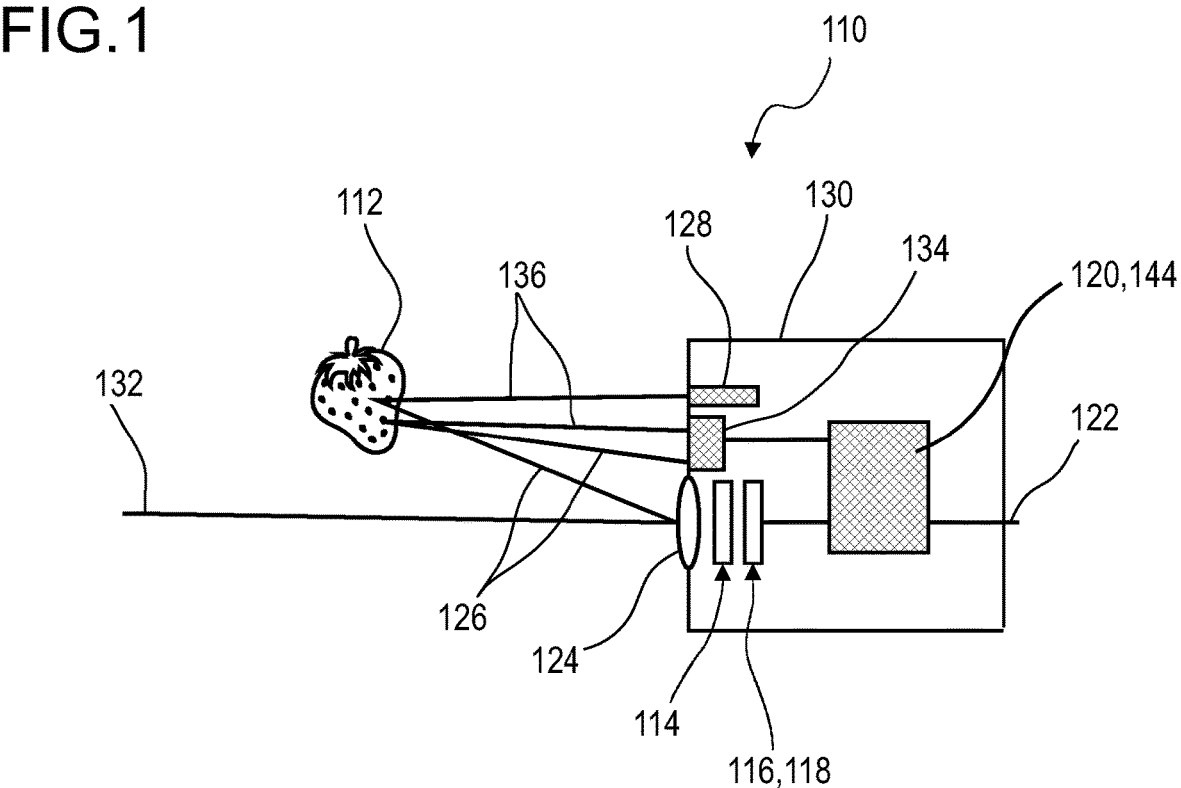
FIG. 1 shows an exemplary embodiment of a spectrometer device according to the present invention.

In FIG. 1, a schematic view of an embodiment of a spectrometer device 110 is depicted. The spectrometer device 110 may be adapted to perform at least one spectroscopic analysis comprising determining at least one difference in at least one light property due to presence of at least one object 112. The difference in the light property may be selected from the group consisting of: at least one wavelength dependent intensity difference; at least one wavelength dependent polarization difference. The spectrometer device 110 comprises a filter element 114 configured for separating incident light into a spectrum of constituent wavelength signals whose respective intensities are determined by employing at least one optical sensor 116 and/or at least one detector array 118. For example, the filter element 114 may be or may comprise at least one prism. For example, the filter element 114 may be and/or may comprise at least one optical filter such as a length variable filter. As outlined above, the spectrometer device 110 comprises the at least one optical sensor 116 and/or the at least one detector array 118 comprising a plurality of pixelated optical sensors. For example, the spectrometer device 110 may comprise the at least one prism and one optical sensor 116. For example, the spectrometer device 110 may comprise the optical filter in combination with the detector array 118. Each of the pixelated optical sensors 116 is adapted to receive at least a portion of one of the constituent wavelength signals. Each of the constituent wavelength signals is related to an intensity of each constituent wavelength. The light which may pass through the filter element 114 at a particular spatial position on the filter element 114 may, subsequently, impinge on the detector array 118. In other words, the detector array 118 may, preferably, be placed in a manner that the light may first impinge on the filter element 114 and only that the partition of the light which may pass through the particular spatial position on the filter element 114 may, thereafter, be capable of impinging on a corresponding spatial position on the detector array 118. As a result, the filter element 114 may, therefore, be used for separating the incident light by its associated wavelength or wavelengths into at least one corresponding spatial position while a particular optical sensor 116 comprised by the detector array 118 may, consequently, be employed for measuring an intensity of the incident light which, due to its particular wavelength, may be able to pass through the filter element 114 at the corresponding spatial position and, therefore, impinge the particular optical sensors 116 provided for determining the intensity of the incident light at the particular wavelength. In a particularly preferred embodiment, the detector array 118 may, thus, comprise a sequence of optical sensor 116 which may be located in form of a series of optical sensors 116 one following the other, wherein the sequence of the optical sensors 116 may be placed in a parallel manner with respect to the continuous arrangement of the interference filters along the length of the filter element 114.

The detector array 118 may, thus, comprise a series of optical sensors 116 which may, preferably, be arranged in a single line as a one-dimensional matrix along the length of the length variable filter or in more than one line, especially as two, three, or four lines parallel lines, in form of a two-dimensional matrix, in particular, in order to receive most of the intensity of the incident light as possible. Thus, a number N of pixels in one direction may be higher compared to a number M of pixels in a further direction such that the one-dimensional 1×N matrix or a rectangular two-dimensional M×N matrix may be obtained, wherein M<10 and N≥10, preferably N≥20, more preferred N≥50. In addition, the matrixes used herein may also be placed in a staggered arrangement. Herein, each of the optical sensors 116 as used therein may have the same or, within a tolerance level, a similar optical sensitivity, especially for ease of manufacturing the series of the optical sensors. However, other kinds of arrangements may also be feasible.

The pixelated optical sensor 116 is designed to generate signals, preferably electronic signals, associated with the intensity of the incident light which impinges on the individual pixelated optical sensor. The signal may be an analogue and/or a digital signal. The electronic signals for adjacent pixelated optical sensors can, accordingly, be generated simultaneously or else in a temporally successive manner. By way of example, during a row scan or line scan, it is possible to generate a sequence of electronic signals which correspond to the series of the individual pixel sensors which are arranged in a line. In addition, the individual pixelated optical sensors 116 may, preferably, be active pixel sensors which may be adapted to amplify the electronic signals prior to providing it to the external evaluation unit. For this purpose, the pixelated optical sensor 116 may comprise one or more signal processing devices, such as one or more filters and/or analogue-digital-converters for processing and/or preprocessing the electronic signals.

The pixelated optical sensor 116 may be selected from any known pixel sensor, in particular, from a pixelated organic camera element, preferably, a pixelated organic camera chip, or from a pixelated inorganic camera element, preferably, a pixelated inorganic camera chip, more preferably from a CCD chip or a CMOS chip, which are, commonly, used in various cameras nowadays. As an alternative, the pixelated optical sensor 116 may be or comprise a photoconductor, in particular an inorganic photoconductor, especially PbS, PbSe, Ge, InGaAs, ext. InGaAs, InSb, or HgCdTe. As a further alternative it may comprise of pyroelectric, bolometer or thermopile detector elements. Thus, a camera chip having a matrix of 1×N pixels or of M×N pixels may be used here, wherein M<10 and N≥10, preferably N≥20, more preferred N≥50. Further, a mono-chrome camera element, preferably a monochrome camera chip, may be used, wherein the monochrome camera element may be differently selected for each pixel sensor, especially, in accordance with the varying wavelength along the series of the optical sensors 116. As a further alternative, the pixelated optical sensor 116 may be based on a FiP sensor which is, among further documents, disclosed in WO 2012/110924 A1, WO 2014/097181 A1, or WO 2016/120392 A1. Preferably, the photosensitive area of each of the FiP sensors may comprise a photoconductive material, especially selected from PbS, PbSe, or HgCdTe, or a solid dye sensitized solar cell (sDSC). Further, WO 2014/198625 A1 discloses a particular embodiment of a detector array which employs a M×N matrix of FiP sensors. Alternatively, further kinds of pixelated optical sensors may also be feasible.

Thus, the optical sensor 116 and/or the detector array 118 may be adapted to provide a plurality of the electrical signals which may be generated by the photosensitive areas of the pixelated optical sensors comprised by the detector array. The electrical signals as provided by the optical sensors 116 may, subsequently, be forwarded to an evaluation device 120. The evaluation device may be configured for determining information related to the spectrum of the object 112 of which a spectrum has been recorded, in particular, by using the spectrometer device 110 as described herein, wherein the information is obtainable by evaluating the detector signals as provided by the optical sensor 116 and/or the detector array 118. The information may, for example, be provided electronically, visually, acoustically or in any arbitrary combination thereof. Further, the information may be stored in a data storage device of the spectrometer device 110 or of a separate storage device and/or may be provided via at least one interface 122, such as a wireless interface and/or a wire-bound interface, for example to at least one external device such as a display device or the like.

Figure 5:
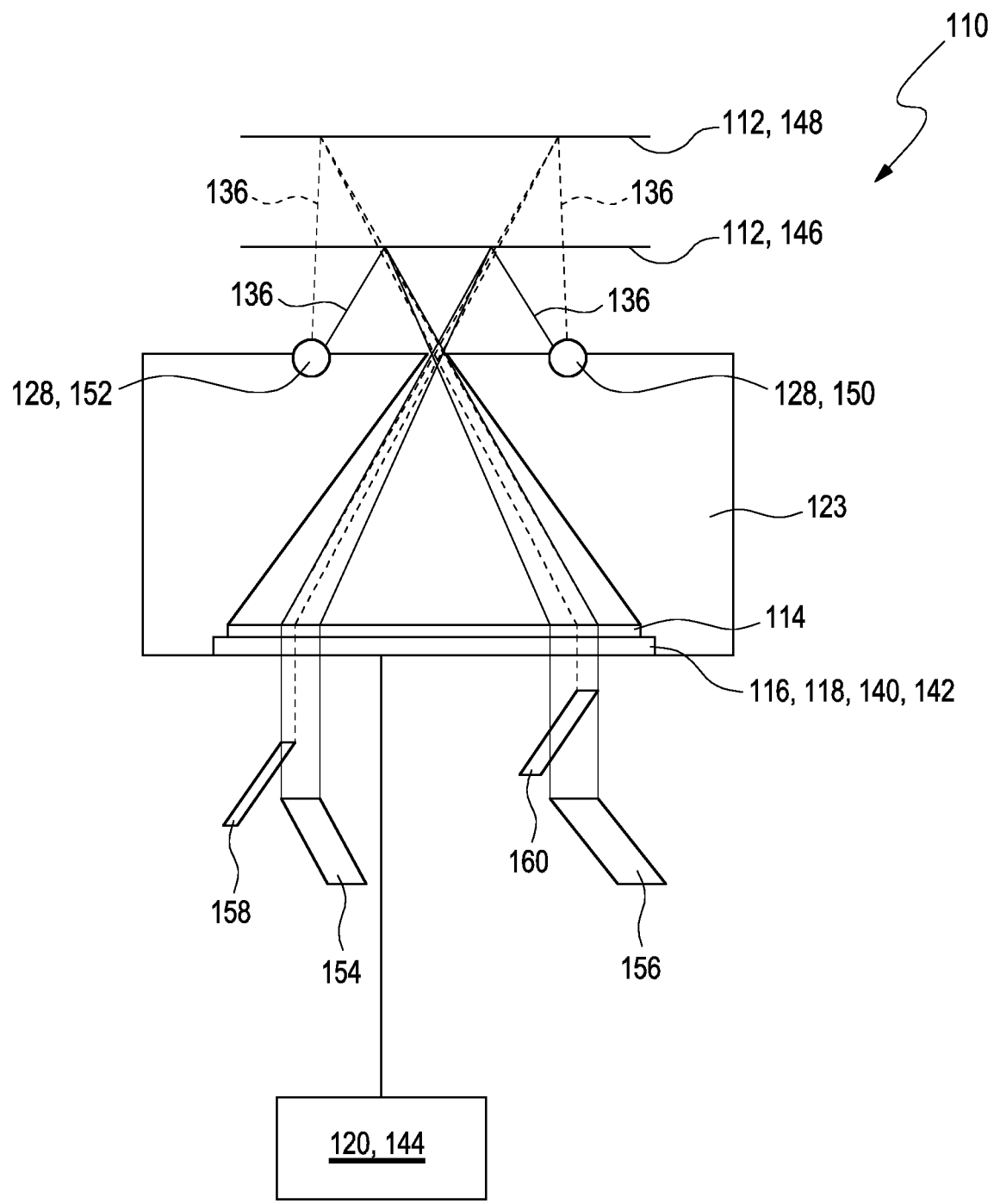
FIG. 5 shows a further exemplary embodiment of the spectrometer device according to the present invention.

The spectrometer device 110 may comprise at least one concentrator device 123, e.g. shown in FIG. 5, for directing the light beam to the filter element 114. In addition, the spectrometer device 110 may, further, comprise at least one transfer device 124. A light beam 126 which emerges from the object 112 may travel firstly through the transfer device 124 until it may, subsequently, pass the filter element 114 until it may, finally, impinge the optical sensor 116 and/or the detector array 118. The transfer device 124 may be selected from a group consisting of an optical lens, a curved mirror, a grating, and a diffractive optical element. More particular, the optical lens may, especially, be selected from a group consisting of a biconvex lens, a plano-convex lens, a biconcave lens, a plano-concave lens, an aspherical lens, a cylindrical lens and a meniscus lens. Hereby, the transfer device 124 may comprise a material which may be at least partially transparent, preferably over the whole wavelength range of the filter element 114 as indicated above. For this purpose, the same or similar optically transparent materials as mentioned in this respect can also be used. However, further optical elements may also be feasible.

The light beam 126 emerging from the object 112 can originate in the object itself, but can also optionally have a different origin and propagate from this origin to the object 112 and subsequently toward the spectrometer device 110. The latter case can, in particular, be affected by at least one illumination source 128 being used. Thus, the light beam 126 propagating from the object 112 to the spectrometer device 110 may be light which may be reflected by the object 112 and/or a reflection device connected to the object 112. Alternatively or in addition, the light may at least partially transmit through the object 112.

The spectrometer device 110 may comprise the illumination source 128. The illumination source 128 can be embodied in various ways. Thus, the illumination source 128 can be for example part of the spectrometer device 110 in a housing 130. Alternatively or additionally, however, the illumination source 128 can also be arranged outside the housing 130, for example as a separate light source. The illumination source 128 can be arranged separately from the object 112 and illuminate the object 112 from a distance. The illumination source 128 may, preferably, comprise a kind of illumination source which may be known to provide sufficient emission in visual spectral range and/or in the infrared (IR) spectral range, especially, in the near infrared (NIR) spectral range, in particular, an incandescent lamp. Alternatively or in addition, the illumination source 128 may, be selected from at least one of the following illumination sources: a laser, in particular a laser diode, although further types of lasers can also be used; a light emitting diode; an organic light source, in particular an organic light emitting diode; a neon light; a structured light source; a flame source; a heat source. Alternatively or additionally, other illumination sources can be used.

The spectrometer device 110 is configured for determining at least one distance information about a distance between the object 112 and the spectrometer device 110. The spectrometer device 110 may be adapted for determining the distance information and the information related to the spectrum of the object simultaneously or subsequently. The spectrometer device may be adapted to perform the determination of the distance information, such as the longitudinal coordinate, before and/or during and/or after the spectroscopic measurement. The spectrometer device 110 may constitute a coordinate system, wherein a longitudinal coordinate is a coordinate along an optical axis 132 of the spectrometer device 110. The coordinate system may be a polar coordinate system in which the optical axis 132 of the spectrometer device 110 forms a z-axis and in which a distance from the z-axis and a polar angle may be used as additional coordinates. A direction parallel or antiparallel to the z-axis may be considered a longitudinal direction, and a coordinate along the z-axis may be considered a longitudinal coordinate or distance. Any direction perpendicular to the z-axis may be considered a transversal direction, and the polar coordinate and/or the polar angle may be considered a transversal coordinate. The distance between the object 112 and the spectrometer device 110 may be obtained by using one or more of: depth-from-photon-ratio, structured light, beam profile analysis, time-of-flight, shape-from-motion, depth-from-focus, triangulation, depth-from-defocus, stereo sensors. Furthermore, the distance information may be obtained using at least one FiP sensor as described in WO 2012/110924 A1 or WO 2014/097181 A1.

FIG. 1 shows an embodiment, wherein spectrometer device 110 comprises at least one distance detector 134 configured for determining the distance between the object 112 and the spectrometer device 110 based on triangulation principle, such as at least one triangulation proximity sensor and/or based on the time-of-flight (TOF) principle. The spectrometer device 110 may comprise at least one time-of-flight sensor. The time-of-flight sensor may be adapted to generate at least one sensor signal dependent on a time-of-flight an illumination light beam 136 has traveled, e.g. from the illumination source 128, to the object 112 and the light beam 126 has traveled from the object 112 to time-of flight sensor. The time-of-flight sensor may be selected from the group consisting of: at least one pulsed time-of-flight detector; at least one phase modulated time-of-flight detector; at least one direct time-of-flight detector; at least one indirect time-of-flight detector. For example, the pulsed time-of-flight detector may be at least one range gated imager and/or at least one direct time-of-flight imager. For example the phase modulated time-of-flight detector may be at least one RF-modulated light source with at least one phase detector. The time-of-flight sensor may be adapted to determine a time delay between emission of the illumination light beam by the illumination source and receipt of the reflection light beam.

Figure 2:
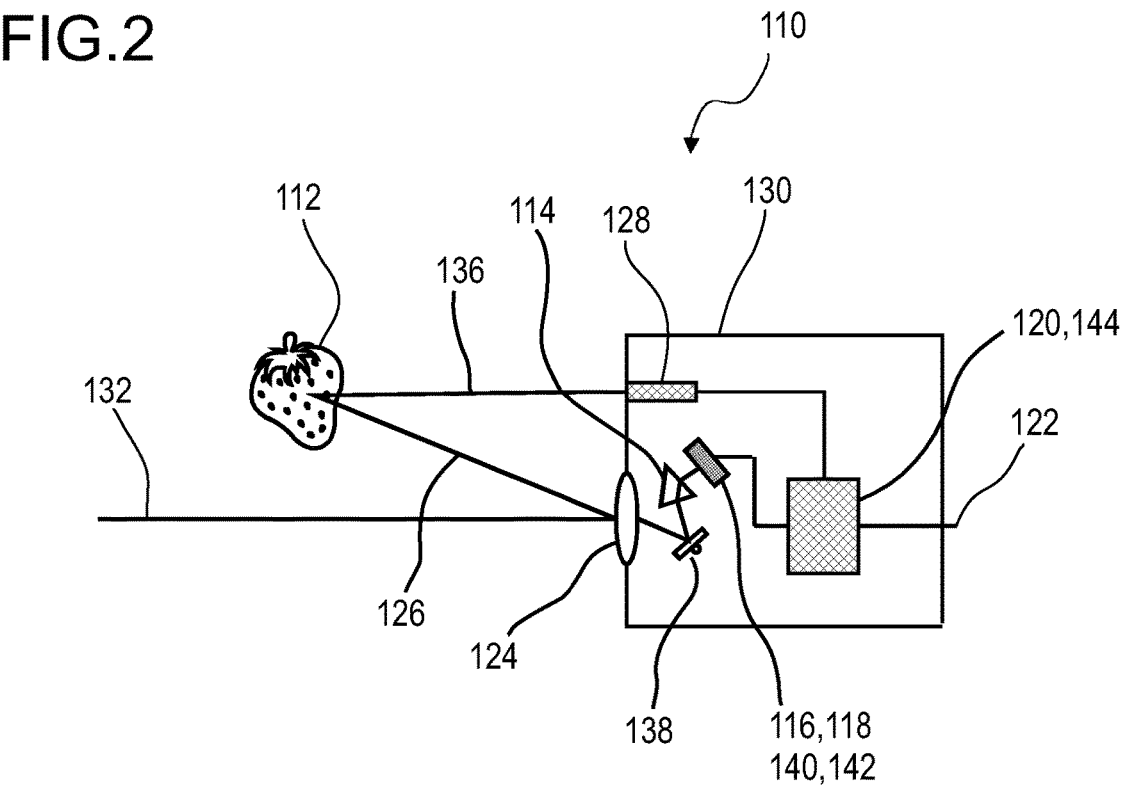
FIG. 2 shows a further exemplary embodiment of the spectrometer device according to the present invention.
Figure 3:
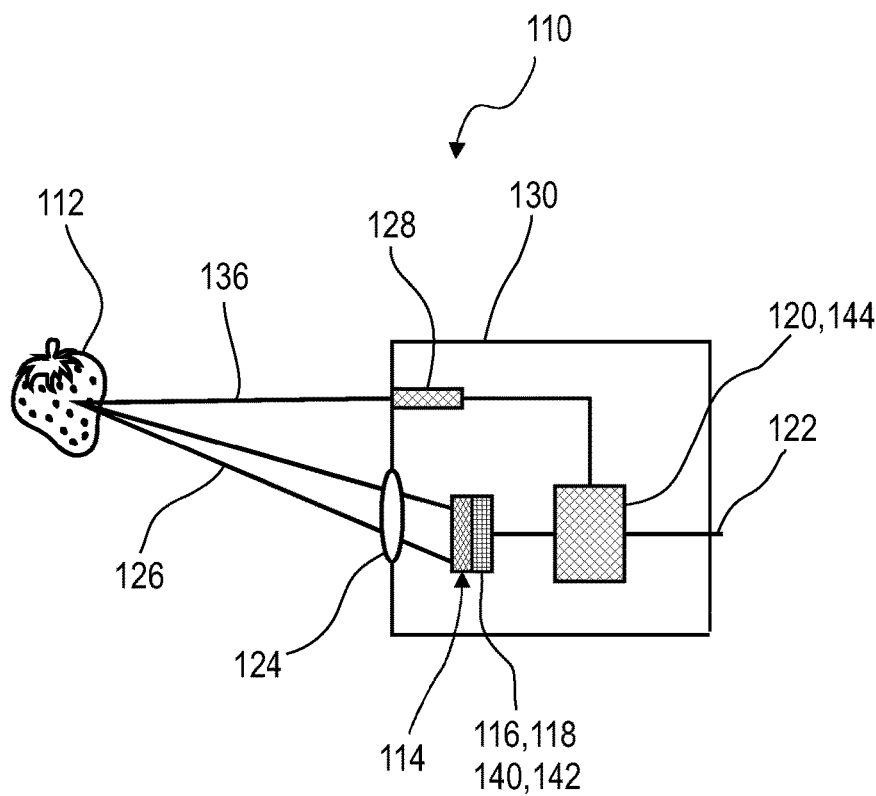
FIG. 3 shows a further exemplary embodiment of the spectrometer device according to the present invention.
Figure 4:
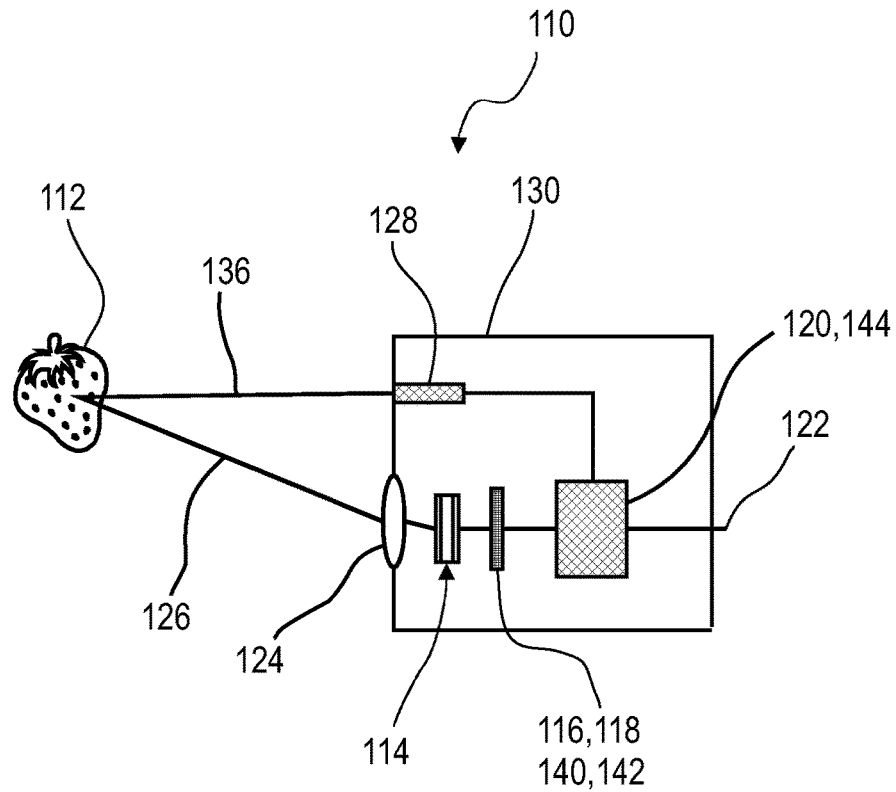
FIG. 4 shows a further exemplary embodiment of the spectrometer device according to the present invention.

FIGS. 2 to 4 show embodiments wherein the spectrometer device 110 may be adapted to determine the position based on the depth-from-photon-ratio technique. With respect to details of methods and devices based on the depth-from-photon-ratio technique reference is made to international patent applications number PCT/EP2017/079577, PCT/EP2017/079558, PCT/EP2017/079564 filed on Nov. 17, 2017 and PCT/EP2018/056545 filed on Mar. 15, 2018 the full content of which is included by reference. Depth-from-photon-ration is a distance measurement technology that is very flexible concerning the detector technology and, thus, also very flexible concerning the wavelength of the employed light source. Known mobile spectrometer technologies use silicon, InAs, InGaAs, or extended InGaAs detectors, wherein silicon is very limited in its wavelength regime and both InAs and InGaAs are expensive. Lead salt detectors show promise for mobile applications due to novel encapsulation technologies allowing compact sensor designs, see e.g. WO 2018/019921 A1. Using depth-from-photon-ratio may allows reliable distance measurement and easy implementation in a spectrometer with little additional effort.

In the embodiment depicted in FIG. 2, the spectrometer device 110 comprises the at least one filter element 114, in particular at least one prism, adapted to separate the incident light beam 126 into a spectrum of constituent wavelength. The light beam 126 may travel from the object 112 to the spectrometer device 110 and may pass through the transfer device 124. The spectrometer device 110 may comprise at least one movable mirror (MEMS) 138 adapted to direct the light beam 126 onto the filter element 114 before impinging on at least one sensor element 140 having a matrix of optical sensors 142.

The optical sensors 142 each having a light-sensitive area. Each optical sensor 142 is configured to generate at least one sensor signal in response to an illumination of the light-sensitive area by the at least one light beam 126 propagating from at least one object 112 to the spectrometer 110. At least one first optical sensor of the optical sensors 142 is adapted to generate a first sensor signal in response to illumination by a first constituent wavelength and wherein at least one second optical sensor of the optical sensors 142 is adapted to generate a second sensor signal in response to an illumination by the first constituent wavelength. The optical sensors 142 and the optical sensors 116 may be identical. Specifically, the optical sensors 142 may be used as optical sensors 116 or the other way round. Thus, the optical sensors 142 may correspond to or may be designed as the optical sensors 116 and/or the matrix of optical sensors 142 may correspond to or may be designed as detector array 118.

The spectrometer device 110 may comprise a plurality of optical sensors 142 each having a light sensitive area. In this case, each optical sensor 142 may be embodied such that precisely one light-sensitive area is present in the respective optical sensor 142, such as by providing precisely one light-sensitive area which may be illuminated, in response to which illumination precisely one uniform sensor signal is created for the whole optical sensor. Thus, each optical sensor may be a single area optical sensor 142. As an example, commercially available photo-sensors, such as commercially available silicon photodiodes, each having precisely one sensitive area, may be used in the set-up. Other embodiments, however, are feasible. The optical sensors 142 may be part of or constitute a pixelated optical device. For example, the optical sensor 142 may be and/or may comprise at least one CCD and/or CMOS device. As an example, the optical sensors 142 may be part of or constitute at least one CCD and/or CMOS device having a matrix of pixels, each pixel forming a light-sensitive area.

The optical sensors 142 specifically may be or may comprise at least one photodetector, preferably inorganic photodetectors, more preferably inorganic semiconductor photodetectors, most preferably silicon photodetectors. Specifically, the optical sensors 142 may be sensitive in the infrared spectral range. All pixels of the matrix or at least a group of the optical sensors of the matrix specifically may be identical. Groups of identical pixels of the matrix specifically may be provided for different spectral ranges, or all pixels may be identical in terms of spectral sensitivity. Further, the pixels may be identical in size and/or with regard to their electronic or optoelectronic properties. Specifically, the optical sensors may be or may comprise at least one inorganic photodiode which are sensitive in the infrared spectral range, preferably in the range of 700 nm to 3.0 micrometers. Specifically, the optical sensors 142 may be sensitive in the part of the near infrared region where silicon photodiodes are applicable specifically in the range of 700 nm to 1100 nm. Infrared optical sensors which may be used for optical sensors 142 may be commercially available infrared optical sensors, such as infrared optical sensors commercially available under the brand name Hertzstueck™ from trinamiX GmbH, D-67056 Ludwigshafen am Rhein, Germany. Thus, as an example, the optical sensors 142 may comprise at least one optical sensor of an intrinsic photovoltaic type, more preferably at least one semiconductor photodiode selected from the group consisting of: a Ge photodiode, an InGaAs photodiode, an extended InGaAs photodiode, an InAs photodiode, an InSb photodiode, a HgCdTe photodiode. Additionally or alternatively, the optical sensors 142 may comprise at least one optical sensor of an extrinsic photovoltaic type, more preferably at least one semiconductor photodiode selected from the group consisting of: a Ge:Au photodiode, a Ge:Hg photodiode, a Ge:Cu photodiode, a Ge:Zn photodiode, a Si:Ga photodiode, a Si:As photodiode. Additionally or alternatively, the optical sensors may comprise at least one photoconductive sensor such as a PbS or PbSe sensor, a bolometer, preferably a bolometer selected from the group consisting of a VO bolometer and an amorphous Si bolometer.

The matrix may be composed of independent pixels such as of independent optical sensors. Thus, a matrix of inorganic photodiodes may be composed. Alternatively, however, a commercially available matrix may be used, such as one or more of a CCD detector, such as a CCD detector chip, and/or a CMOS detector, such as a CMOS detector chip. Thus, generally, the optical sensor 142 may be and/or may comprise at least one CCD and/or CMOS device and/or the optical sensors of the detector may form a sensor array or may be part of a sensor array, such as the above-mentioned matrix. Thus, as an example, the optical sensors 142 may comprise and/or constitute an array of pixels, such as a rectangular array, having m rows and n columns, with m, n, independently, being positive integers. For example, the sensor element 140 may comprise at least two optical sensors 142 arranged in a row and or column such as a bi-cell. For example, the sensor element 140 may a quadrant diode system comprising a 2×2 matrix of optical sensors. For example, more than one column and more than one row is given, i.e. n>1, m>1. Thus, as an example, n may be 2 to 16 or higher and m may be 2 to 16 or higher. Preferably, the ratio of the number of rows and the number of columns is close to 1. As an example, n and m may be selected such that $0.3 \leq m/n \leq 3$, such as by choosing m/n=1:1, 4:3, 16:9 or similar. As an example, the array may be a square array, having an equal number of rows and columns, such as by choosing m=2, n=2 or m=3, n=3 or the like.

The matrix specifically may be a rectangular matrix having at least one row, preferably a plurality of rows, and a plurality of columns. As an example, the rows and columns may be oriented essentially perpendicular. In order to provide a wide range of view, the matrix specifically may have at least 10 rows, preferably at least 500 rows, more preferably at least 1000 rows. Similarly, the matrix may have at least 10 columns, preferably at least 500 columns, more preferably at least 1000 columns. The matrix may comprise at least 50 optical sensors, preferably at least 100000 optical sensors, more preferably at least 5000000 optical sensors. The matrix may comprise a number of pixels in a multi-mega pixel range. Other embodiments, however, are feasible. Thus, in setups in which an axial rotational symmetry is to be expected, circular arrangements or concentric arrangements of the optical sensors of the matrix, which may also be referred to as pixels, may be preferred. Preferably, the light sensitive area may be oriented essentially perpendicular to the optical axis 132 of the spectrometer device 110. The optical axis 132 may be a straight optical axis or may be bent or even split, such as by using one or more deflection elements and/or by using one or more beam splitters, wherein the essentially perpendicular orientation, in the latter cases, may refer to the local optical axis in the respective branch or beam path of the optical setup.

As outlined above, in the embodiment of FIG. 2, the spectrometer device 110 comprises a prism as filter element 114 in combination with a movable mirror (MEMS) 138 adapted to direct the light beam 126 onto the prism before impinging on the sensor element 140 having a matrix of optical sensors 142. In particular, in the embodiment of FIG. 2, the optical sensors 116, 142 may be parts of a quadrant diode system comprising a 2×2 matrix of optical sensors 116, 142.

In the embodiment of FIG. 3, the spectrometer device 110 comprises an optical filter such as a linear variable filter as filter element 114. For determining the distance information using depth-from-photon-ratio technique and for spectroscopy the same array of optical sensors 116, 142 may be used. In FIG. 3, the optical sensors 116, 142 may be arranged in the sensor element 140 having the matrix of optical sensors 116, 142 which is used as detector array 118 for spectroscopy.

In the embodiment of FIG. 4, the optical sensors 116, 142 may be parts of a quadrant diode system comprising a 2×2 matrix of optical sensors 116, 142. The spectrometer device 110 comprises an adjustable interferometer as filter element 114. For example, the adjustable interferometer may be a Fabry Perot interferometer e.g. based on a Micro Electro Mechanical System, as available from Spectral Engines Oy, Helsinki, Finland. For determining the distance information using depth-from-photon-ratio technique and for spectroscopy the same array of optical sensors 116, 142 may be used.

For determining a longitudinal coordinate of the object 112 using depth-from-photon-ratio technology at least two optical sensors 142 may be employed. For spectroscopy, one optical sensor 116 in combination with a prism or several optical sensors 116 in combination with an optical filer may be employed. For example, one of the optical sensors 142 used for determining a longitudinal coordinate of the object using depth-from-photon-ratio technology may be employed for spectroscopy. For example, the detector array 118 used for spectroscopy may be used for determining a longitudinal coordinate of the object 112 using depth-from-photon-ratio technology, too. Thus, using depth-from-photon-ratio may allow reliable distance measurement and easy implementation in a spectrometer with little additional effort.

The evaluation device 120 may be configured for determining at least one longitudinal coordinate z of the object 112 by evaluating a combined signal Q from the first sensor signal and the second sensor signal. The evaluation device 120 may be configured for deriving the combined signal by one or more of dividing the sensor signals, dividing multiples of the sensor signals, dividing linear combinations of the sensor signals. The evaluation device 120 may be configured for using at least one predetermined relationship between the combined signal and the longitudinal coordinate for determining the longitudinal coordinate. The predetermined relationship may be one or more of an empiric relationship, a semi-empiric relationship and an analytically derived relationship. The evaluation device 120 may comprise at least one data storage device for storing the predetermined relationship, such as a lookup list or a lookup table.

The combined signal may be determined by using various means. As an example, a software means for deriving a quotient signal, a hardware means for deriving the quotient signal, or both, may be used and may be implemented in the evaluation device. Thus, the evaluation device 120, as an example, may comprise at least one divider 144, wherein the divider 144 is configured for deriving the quotient signal. The divider 144 may fully or partially be embodied as one or both of a software divider or a hardware divider. The divider 144 may fully or partially be integrated into the sensor element 140 answers or may fully or partially be embodied independent from the sensor element 140.

For example, the combined signal Q, are derived by $$Q(z_o) = \frac{\iint_{A_1} E(x, y, z_o) dx dy}{\iint_{A_2} E(x, y, z_o) dx dy}$$

wherein x and y are transversal coordinates, A1 and A2 are different areas of the at least one beam profile at the position of the sensor element 140, and $E(x,y,z_o)$ denotes a beam profile given at the distance $z_o$. The beam profile may be selected from the group consisting of a trapezoid beam profile; a triangle beam profile; a conical beam profile and a linear combination of Gaussian beam profiles. Area A1 and area A2 may differ. In particular, A1 and A2 are not congruent. Thus, A1 and A2 may differ in one or more of the shape or content. Each of the sensor signals may comprises at least one information of at least one area of the beam profile. Generally the beam profile is dependent on luminance $L(z_o)$ and beam shape $S(x,y;z_o)$, $E(x,y;z_o)=L·S$. Thus, by deriving the combined signal it may allow determining the longitudinal coordinate independent from luminance. In addition, using the combined signal allows determination of the distance $z_o$ independent from an object size. Thus, the combined signal allows determination of the distance $z_o$ independent from the material properties and/or reflective properties and/or scattering properties of the object 112 to be measured and independent from alterations of the light source such as by manufacturing precision, heat, water, dirt, damages on the lens, or the like.

Each of the first sensor signal and the second sensor signal may comprise at least one information of the at least one area of the beam profile. The light-sensitive areas may be arranged such that one of the sensor signals comprises information of a first area of the beam profile and the other one of the sensor signals comprises information of a second area of the beam profile. The first area of the beam profile and the second area of the beam profile may be one or both of adjacent or overlapping regions. The first area and the second area may be not congruent in area. The first area of the beam profile may comprise essentially edge information of the beam profile and the second area of the beam profile may comprise essentially center information of the beam profile. The edge information may comprise information relating to a number of photons in the first area of the beam profile and the center information comprises information relating to a number of photons in the second area of the beam profile. The evaluation device 120 may be configured to determine and/or to select the first area of the beam profile and the second area of the beam profile. The beam profile may have a center, i.e. a maximum value of the beam profile and/or a center point of a plateau of the beam profile and/or a geometrical center of the light spot, and falling edges extending from the center. The second region may comprise inner regions of the cross section and the first region may comprise outer regions of the cross section. Preferably the center information has a proportion of edge information of less than 10%, more preferably of less than 5%, most preferably the center information comprises no edge content. The edge information may comprise information of the whole beam profile, in particular from center and edge regions. The edge information may have a proportion of center information of less than 10%, preferably of less than 5%, more preferably the edge information comprises no center content. At least one area of the beam profile may be determined and/or selected as second area of the beam profile if it is close or around the center and comprises essentially center information. At least one area of the beam profile may be determined and/or selected as first area of the beam profile if it comprises at least parts of the falling edges of the cross section. For example, the whole area of the cross section may be determined as first region. The first area of the beam profile may be area A1 and the second area of the beam profile may be area A2.

Other selections of the first area A1 and second area A2 may be feasible. For example, the first area may comprise essentially outer regions of the beam profile and the second area may comprise essentially inner regions of the beam profile. For example, in case of a two-dimensional beam profile, the beam profile may be divided in a left part and a right part, wherein the first area may comprise essentially areas of the left part of the beam profile and the second area may comprise essentially areas of the right part of the beam profile.

The edge information may comprise information relating to a number of photons in the first area of the beam profile and the center information may comprise information relating to a number of photons in the second area of the beam profile. The evaluation device 120 may be adapted for determining an area integral of the beam profile. The evaluation device 120 may be adapted to determine the edge information by integrating and/or summing of the first area. The evaluation device may be adapted to determine the center information by integrating and/or summing of the second area. For example, the beam profile may be a trapezoid beam profile and the evaluation device may be adapted to determine an integral of the trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations. Additionally or alternatively, the evaluation device 120 may be adapted to determine one or both of center information or edge information from at least one slice or cut of the light spot. This may be realized, for example, by replacing the area integrals in the combined signal by a line integral along the slice or cut. For improved accuracy, several slices or cuts through the light spot may be used and averaged. In case of an elliptical spot profile, averaging over several slices or cuts may result in improved distance information.

As explained, e.g. in WO 2012/110924 A1 or WO 2014/097181 A1, typically, a predetermined or determinable relationship exists between a size of a light spot, such as a diameter of the light spot, a beam waist or an equivalent diameter, and the longitudinal coordinate of the object from which the light beam propagates towards the sensor element. Without wishing to be bound by this theory, the light spot may be characterized by two measurement variables: a measurement signal measured in a small measurement patch in the center or close to the center of the light spot, also referred to as the center signal, and an integral or sum signal integrated over the light spot, with or without the center signal. For a light beam having a certain total power which does not change when the beam is widened or focused, the sum signal should be independent from the spot size of the light spot, and, thus, should, at least when linear optical sensors within their respective measurement range are used, be independent from the distance between the object 112 and the sensor element 140. The center signal, however, is dependent on the spot size. Thus, the center signal typically increases when the light beam is focused, and decreases when the light beam is defocused. By comparing the center signal and the sum signal, thus, an item of information on the size of the light spot generated by the light beam and, thus, on the longitudinal coordinate of the location of reflection may be generated. The comparing of the center signal and the sum signal, as an example, may be done by forming the combined signal Q out of the center signal and the sum signal and by using a predetermined or determinable relationship between the longitudinal coordinate and the combined signal for deriving the longitudinal coordinate.

The evaluation device 120 may be adapted to determine those optical sensors 142 of the matrix of optical sensors 140 illuminated by the first wavelength constituent. The evaluation device 120 may be configured for determining the at least one optical sensor 142 illuminated by the first constituent wavelength and having the highest sensor signal and forming the first sensor signal. The first sensor signal may be at least one center signal. The evaluation device 120 may be configured for evaluating the sensor signals of the optical sensors 142 of the matrix illuminated by the first wavelength constituent and forming the second sensor signal. The second sensor signal is at least one sum signal. The evaluation device 120 may be configured for determining the combined signal Q by combining the center signal and the sum signal.

For example, the center signal may be the signal of the at least one optical sensor 142 and/or pixel having the highest sensor signal out of the plurality of sensor signals generated by the optical sensors 142 and/or pixels of the entire matrix or of a region of interest within the matrix, wherein the region of interest may be predetermined or determinable within an image generated by the optical sensors 142 and/or pixels of the matrix. The center signal may arise from a single optical sensor 142 and/or pixel or from a group of optical sensors 142, wherein, in the latter case, as an example, the sensor signals of the group of optical sensors and/or pixels may be added up, integrated or averaged, in order to determine the center signal. The group of optical sensors 142 and/or pixels from which the center signal arises may be a group of neighboring optical sensors and/or pixels, such as optical sensors and/or pixels having less than a predetermined distance from the actual optical sensor 142 and/or pixel having the highest sensor signal, or may be a group of optical sensors 142 and/or pixels generating sensor signals being within a predetermined range from the highest sensor signal. The group of optical sensors 142 and/or pixels from which the center signal arises may be chosen as large as possible in order to allow maximum dynamic range. The evaluation device 120 may be adapted to determine the center signal by integration of the plurality of sensor signals, for example the plurality of optical sensors and/or pixels around the optical sensor 142 and/or pixel having the highest sensor signal.

As outlined above, the center signal generally may be a single sensor signal, such as a sensor signal from the optical sensor 142 and/or pixel in the center of the light spot, or may be a combination of a plurality of sensor signals, such as a combination of sensor signals arising from optical sensors and/or pixels in the center of the light spot, or a secondary sensor signal derived by processing a sensor signal derived by one or more of the aforementioned possibilities. The determination of the center signal may be performed electronically, since a comparison of sensor signals is fairly simply implemented by conventional electronics, or may be performed fully or partially by software. Specifically, the center signal may be selected from the group consisting of: the highest sensor signal; an average of a group of sensor signals being within a predetermined range of tolerance from the highest sensor signal; an average of sensor signals from a group of optical sensors and/or pixels containing the optical sensor 142 and/or pixel having the highest sensor signal and a predetermined group of neighboring optical sensors 142 and/or pixels; a sum of sensor signals from a group of optical sensors and/or pixels containing the optical sensor 142 and/or pixel having the highest sensor signal and a predetermined group of neighboring optical sensors 142 and/or pixels; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors 142 containing the optical sensor 142 having the highest sensor signal and a predetermined group of neighboring optical sensors; an integral of a group of sensor signals being within a predetermined range of tolerance from the highest sensor signal; an integral of a group of sensor signals being above a predetermined threshold.

For example, the sum signal may be derived by adding up the sensor signals, integrating over the sensor signals or averaging over the sensor signals of the entire matrix or of a region of interest within the matrix, wherein the region of interest may be predetermined or determinable within an image generated by the optical sensors 142 of the matrix. When adding up, integrating over or averaging over the sensor signals, the actual optical sensors from which the sensor signal is generated may be left out of the adding, integration or averaging or, alternatively, may be included into the adding, integration or averaging. The evaluation device 120 may be adapted to determine the sum signal by integrating signals of the entire matrix, or of the region of interest within the matrix. For example, the beam profile may be a trapezoid beam profile and the evaluation device may be adapted to determine an integral of the entire trapezoid. Further, when trapezoid beam profiles may be assumed, the determination of edge and center signals may be replaced by equivalent evaluations making use of properties of the trapezoid beam profile such as determination of the slope and position of the edges and of the height of the central plateau and deriving edge and center signals by geometric considerations.

Similarly, the center signal and edge signal may also be determined by using segments of the beam profile such as circular segments of the beam profile. For example, the beam profile may be divided into two segments by a secant or a chord that does not pass the center of the beam profile. Thus, one segment will essentially contain edge information, while the other segment will contain essentially center information. For example, to further reduce the amount of edge information in the center signal, the edge signal may further be subtracted from the center signal.

The combined signal Q may be a signal which is generated by combining the center signal and the sum signal. Specifically, the determining may include one or more of: forming a quotient of the center signal and the sum signal or vice versa; forming a quotient of a multiple of the center signal and a multiple of the sum signal or vice versa; forming a quotient of a linear combination of the center signal and a linear combination of the sum signal or vice versa. Additionally or alternatively, the combined signal Q may comprise an arbitrary signal or signal combination which contains at least one item of information on a comparison between the center signal and the sum signal.

The evaluation device may be configured for evaluating at least one sensor signal generated by the optical sensors 142 of the matrix of optical sensor 142 by performing at least one spectroscopic analysis considering the determined longitudinal coordinate z. Specifically, the evaluation device 120 may be configured for determining light attenuation due to the distance between the object and the spectrometer device. The evaluation device 120 may be adapted to perform the spectroscopic analysis considering the light attenuation. The evaluation device 120 may be adapted to correct intensities of the spectrum of constituent wavelength signals determined by the optical detector. Specifically, the evaluation device 120 may be adapted to correct the determined intensity values for light attenuation, for example by multiplying and/or dividing the determined intensity values with at least one correction function. The correction function may be determined empirically and/or semi-empirically and/or analytically. For example, the spectrometer device 110 may be configured for determining light attenuation by measuring a background spectrum depending on optics, light source, characteristics of light sources, dirt and the like. and to derive a correction function, such as a background correction function, therefrom. However, during measuring of the background spectrum the distance between object 112 and spectrometer device 110 may be kept fixed. The spectrometer device 110 may be a mobile spectrometer device. Specifically, the distance between the object 112 and the spectrometer device 110 may be variable. The evaluation device 120 may be configured for determining alteration of the distance between the object and the spectrometer device. Thus, the intensity values and/or the background spectrum have to be corrected further for influences due to distance and alteration in distance between object 112 and spectrometer device 110. The evaluation device 120 may be adapted to correct the determined light attenuation for influences due to the distance between the object 112 and the spectrometer device 120. For correction of light attenuation due to distance a further correction function such as a polynomial correction function, for example a second order or higher order polynomial, may be used. For example, the distance dependent light attenuation may be corrected by a fraction of polynomials in z such as a polynomial up to third order in z divided by a polynomial up to fifth order in z, whereas coefficients may be used to adjust the distance dependent light attenuation function. For example, the correction function may be a rational polynomial function. For example, a polynomial $A \cdot 1/z^2$, with A being a coefficient or constant and z being the longitudinal coordinate z, may be used. The further correction function may be determined considering light emitting characteristics of the illumination source 128. In addition, the further correction function may be determined by considering predetermined reflection properties of the object 112, e.g. determined using spot profiles, and/or assumed reflection properties of the object 112. Further, the correction function may be a combined correction function correcting the light attenuation due to optics, ambient light, dirt, temperature, and correcting the distance dependent light attenuation simultaneously. As an example, the combined correction function may be a product of a distance independent correction function such as a background correction function and a distance dependent correction function.

The spectrometer device 110 may be configured for contactless spectroscopy. Determining the distance information and using the distance information for correction of the spectroscopic measurement allows for variable distances between the object and the spectrometer device. Direct mechanical contact or use of special sample boxes can be avoided.

FIG. 5 shows a further exemplary embodiment of the spectrometer device 110 according to the present invention. The spectrometer device 110 comprises a filter element 114, wherein the filter element 114 is configured for separating incident light into a spectrum of constituent wavelength signals whose respective intensities are determined by employing at least one optical sensor 116 and/or at least one detector array 118. In this embodiment, the filter element 114 is a linear variable filter. The spectrometer device 110 comprises the tapered light concentrator 123.

The spectrometer device 110 furthermore comprises two illumination sources 128, wherein each illumination source 128 is configured to illuminate object 112 by generating and emitting the at least one illumination light beam 136. The illumination sources 128 may be employed simultaneously or may be employed alternatingly for illumination of the object 112. The illumination light beam 136 originating from one of the illumination sources 128 may be reflected directly and/or may be scattered from the object 112. The direct reflection may not be directly distinguishable from the spectral information alone. The direct reflection may be distance dependent and may be less wavelength dependent than scattered light. The spectrometer device 110 may be adapted to separate the direct reflection and the spectrum of the scattered light by recording at least two spectra at different object distances and/or by recording and comparing at least two spectra using the two light sources alternatingly.

For example, the illumination sources 128 may be employed alternatingly. For example, firstly, the illumination light beam 136 originating e.g. from a first illumination source 150 may be reflected directly and/or may be scattered from the object 112 at a first distance 146 and the optical sensors 116 may be adapted to record at least one first spectrum. Subsequently, the illumination light beam 136 originating from a second illumination source 152 may be reflected directly and/or may be scattered from the object 112 at the first distance 146 and the optical sensors 116 may be adapted to record at least one second spectrum. The order or sequence of using the illumination sources 128 is described exemplary only such that other orders of using the illumination sources 128 are possible such as firstly using the second illumination source 152 and subsequently the first illumination source 150 and/or repetitive usage of one or both illumination source 150, 152. The spectrometer device 110 is configured for determining at least one distance information about a distance between the at least one object 112 and the spectrometer device 110. By comparing the first spectrum and the second spectrum the evaluation device 120 may be configured for determining at least two direct reflection peaks on the sensor element 140, specifically a first direct reflection peak originating from direct reflection from the object 112 illuminated by the first illumination source 150 and a second reflection peak originating from direct reflection from the object 112 illuminated by the second illumination source 152. Specifically, the evaluation device 120 may be configured to determine differences in the intensity distribution as a function of the wavelength, in particular peaks, by comparing the first and the second spectra. The location of the determined peak in the respective spectrum may correspond to a location on the matrix of optical sensors 116, 142. The evaluation device 120 may be adapted to determine a location at which the directly reflected light impinges on the matrix of optical sensors 116, 142. For example, the evaluation device 120 may be adapted to determine a location 154 at which the directly reflected light originating from the object 112 at the first distance 146 illuminated by the first illumination source 150 impinges on the matrix of optical sensors 116, 142. The evaluation device 120 may be adapted to determine a location 156 at which the directly reflected light originating from the object 112 at the first distance 146 illuminated by the second illumination source 150 impinges on the matrix of optical sensors 116, 142. As outlined above, the direct reflection may be distance dependent and may be less wavelength dependent than scattered light. Once the locations 154 and 156 are known, triangulation algorithms can be used to determine the distance information about the first distance between the spectrometer device 110 and the object 112. The evaluation device 120 may be adapted to determine the first distance of the object 112 by using at least one triangulation algorithm.

For example, the illumination sources 128 may be employed simultaneously. The illumination light beam 136 originating e.g. from the first illumination source 150 may be reflected directly and/or may be scattered from the object 112 at the first distance 146. The second illumination source 152 may be employed for illuminating the object 112. The illumination light beam 136 originating from the second illumination source 152 may be reflected directly and/or may be scattered from the object 112 at the first distance 146. The optical sensors 116 may be adapted to record the at least one first spectrum of the received light for the object 112 at the first distance 146. Recording of the spectrum is repeated for a second distance 148 of the object 112. The illumination light beam 136 originating e.g. from the first illumination source 150 may be reflected directly and/or may be scattered from the object 112 at the second distance 148. The illumination light beam 136 originating from the second illumination source 152 may be reflected directly and/or may be scattered from the object 112 at the second distance 148. The optical sensors 116 may be adapted to record the at least one first spectrum of the received light for the object 112 at the second distance 148. By comparing the first spectrum and the second spectrum the evaluation device 120 may be configured for determining at least four direct reflection peaks on the sensor element 140. Specifically, the evaluation device 120 may be adapted to determine in the first spectrum a first direct reflection peak originating from direct reflection from the object 112 illuminated by the first illumination source 150 and a second reflection peak originating from direct reflection from the object 112 illuminated by the second illumination source 152. Specifically, the evaluation device 120 may be adapted to determine in the second spectrum a third direct reflection peak originating from direct reflection from the object 112 illuminated by the first illumination source 150 and a fourth reflection peak originating from direct reflection from the object 112 illuminated by the second illumination source 152. The evaluation device 120 may be configured to determine differences in the intensity distribution as a function of the wavelength, in particular peaks, by comparing the first and the second spectra. The location of the determined peak in the respective spectrum may correspond to a location on the matrix of optical sensors 116, 142. Specifically, the evaluation device 120 may be adapted to determine the locations at which the directly reflected light impinges on the matrix of optical sensors 116, 142. For example, in the embodiment of FIG. 5, wherein the reflected light originates from the object 112 at the first distance 146 and the second distance 148, the evaluation device 120 may be adapted to determine the location 154 at which the directly reflected light originating from the object 112 at the first distance 146 illuminated by the first illumination source 150 impinges on the matrix of optical sensors 116, 142. The evaluation device 120 may be adapted to determine the location 156 at which the directly reflected light originating from the object 112 at the first distance 146 illuminated by the second illumination source 150 impinges on the matrix of optical sensors 116, 142. The evaluation device 120 may be adapted to determine a location 158 at which the directly reflected light originating from the object 112 at the second distance 148 illuminated by the first illumination source 150 impinges on the matrix of optical sensors 116, 142. The evaluation device 120 may be adapted to determine a location 160 at which the directly reflected light originating from the object 112 at the first distance 146 illuminated by the second illumination source 150 impinges on the matrix of optical sensors 116, 142. Once at least two locations corresponding to the same object distance of the locations 154, 156, 158 and 160 are known, triangulation algorithms can be used to determine the distance information about the distance between the spectrometer device 110 and the object 112. The evaluation device 120 may be adapted to determine the distance to the object 112 by using at least one triangulation algorithm.

LIST OF REFERENCE NUMBERS 110 spectrometer device
112 object
114 filter element
116 optical sensor
118 detector array
120 evaluation device
122 interface
123 concentrator device
124 transfer device
126 light beam
128 illumination source
130 housing
132 optical axis
134 distance detector
136 illumination light beam
138 movable mirror
140 sensor element
142 optical sensor
144 divider
144 illumination source
146 first distance
148 second distance
150 first illumination source
152 second illumination source
154 location
156 location
158 location
160 location

The invention claimed is:

1. A spectrometer device comprising:
at least one filter element adapted to separate at least one incident light beam into a spectrum of constituent wavelength;
at least one sensor element having a matrix of optical sensors, the optical sensors each having a light-sensitive area, wherein each optical sensor is configured to generate at least one sensor signal in response to an illumination of the light-sensitive area by at least one light beam propagating from at least one object to the spectrometer, wherein at least one first optical sensor of the optical sensors is adapted to generate a first sensor signal in response to illumination by a first constituent wavelength and wherein at least one second optical sensor of the optical sensors is adapted to generate a second sensor signal in response to an illumination by the first constituent wavelength; and
at least one evaluation device configured for determining at least one longitudinal coordinate of the at least one object by evaluating a combined signal from the first sensor signal and the second sensor signal, wherein the evaluation device is configured for evaluating at least one sensor signal generated by the optical sensors of the matrix of optical sensor by performing at least one spectroscopic analysis considering the determined longitudinal coordinate, wherein the combined signal is derived by one or more of: forming a quotient of the first signal and the second signal or vice versa; forming a quotient of a multiple of the first signal and a multiple of the second signal or vice versa; forming a quotient of a linear combination of the first signal and a linear combination of the second signal or vice versa; and forming a quotient of a first linear combination of the first signal and the second signal and a second linear combination of the first signal and the second signal.

2. The spectrometer device according to claim 1, wherein the spectrometer device is a mobile spectrometer device.

3. The spectrometer device according to claim 1, wherein the spectrometer device is configured for contactless spectroscopy.

4. The spectrometer device according to claim 1, wherein the spectrometer device is configured such that a distance between the at least one object and the spectrometer device is variable.

5. The spectrometer device according to claim 4, wherein the evaluation device is configured for determining alteration of the distance between the at least one object and the spectrometer device.

6. The spectrometer device according to claim 4, wherein the evaluation device is adapted to determine light attenuation due to distance between the at least one object and the spectrometer device from the determined longitudinal coordinate of the at least one object.

7. The spectrometer device according to claim 1, wherein the spectroscopic analysis comprises determining at least one difference in at least one light property due to presence of the at least one object, wherein the difference in the light property is selected from the group consisting of: at least one wavelength dependent intensity difference and at least one wavelength dependent polarization difference.

8. The spectrometer device according to claim 1, wherein the evaluation device is configured for using at least one predetermined relationship between the combined signal and the longitudinal coordinate of the at least one object for determining the longitudinal coordinate.

9. The spectrometer device according to claim 1, wherein the spectrometer device comprises at least one illumination source, wherein the illumination source is adapted to illuminate the at least one object with at least one illumination light beam.

10. The spectrometer device according to claim 1, wherein the evaluation device is configured for determining the at least one optical sensor illuminated by the first constituent wavelength and having the highest sensor signal and forming the first sensor signal, wherein the first sensor signal is at least one center signal, wherein the evaluation device is configured for evaluating the sensor signals of the optical sensors of the matrix illuminated by the first wavelength constituent and forming the second sensor signal, wherein the second sensor signal is at least one sum signal, wherein the evaluation device is configured for determining the combined signal by combining the center signal and the sum signal.

11. The spectrometer device according to claim 10, wherein the center signal is selected from the group consisting of: the highest sensor signal; an average of a group of sensor signals being within a predetermined range of tolerance from the highest sensor signal; an average of sensor signals from a group of optical sensors containing the optical sensor having the highest sensor signal and a predetermined group of neighboring optical sensors; a sum of sensor signals from a group of optical sensors containing the optical sensor having the highest sensor signal and a predetermined group of neighboring optical sensors; a sum of a group of sensor signals being within a predetermined range of tolerance from the highest sensor signal; an average of a group of sensor signals being above a predetermined threshold; a sum of a group of sensor signals being above a predetermined threshold; an integral of sensor signals from a group of optical sensors containing the optical sensor having the highest sensor signal and a predetermined group of neighboring optical sensors; an integral of a group of sensor signals being within a predetermined range of tolerance from the highest sensor signal; an integral of a group of sensor signals being above a predetermined threshold, wherein the sum signal is selected from the group consisting of: an average over all sensor signals of the matrix; a sum of all sensor signals of the matrix; an integral of all sensor signals of the matrix an average over all sensor signals of the matrix except for sensor signals from those optical sensors contributing to the center signal; a sum of all sensor signals of the matrix except for sensor signals from those optical sensors contributing to the center signal; an integral of all sensor signals of the matrix except for sensor signals from those optical sensors contributing to the center signal; a sum of sensor signals of optical sensors within a predetermined range from the optical sensor having the highest sensor signal; an integral of sensor signals of optical sensors within a predetermined range from the optical sensor having the highest sensor signal; a sum of sensor signals above a certain threshold of optical sensors being located within a predetermined range from the optical sensor having the highest sensor signal; and an integral of sensor signals above a certain threshold of optical sensors being located within a predetermined range from the optical sensor having the highest sensor signal.

12. The spectrometer device according to claim 1, wherein the spectrometer device is adapted to determine at least one further longitudinal coordinate of the object by evaluating the combined signal from a first sensor signal and a second sensor signal generated in response to a second constituent wavelength, wherein the evaluation device is adapted to determine a combined longitudinal coordinate from the longitudinal coordinate and the further longitudinal coordinate and to perform the spectroscopic analysis considering the combined longitudinal coordinate.

13. A method for determining at least one difference in at least one light property of at least one light beam originating from at least one object, wherein in the method a spectrometer device according to claim 1, the method comprising:
    separating at least one incident light beam into a spectrum of constituent wavelength by using at least one filter element of the spectrometer device;
    illuminating at least one sensor element of the spectrometer device with at least one constituent wavelength of the light beam, the spectrometer device having a matrix of optical sensors, the optical sensors each having a light-sensitive area, wherein each optical sensor is generates at least one sensor signal in response to an illumination of the light-sensitive area, wherein at least one first optical sensor of the optical sensors generates a first sensor signal in response to illumination by a first constituent wavelength and wherein at least one second optical sensor of the optical sensors generates a second sensor signal in response to illumination by the first constituent wavelength; and
    determining at least one longitudinal coordinate of the object by evaluating a combined signal from the first sensor signal and the second sensor signal and evaluating at least one sensor signal generated by the optical sensors of the matrix of optical sensor by performing at least one spectroscopic analysis considering the determined longitudinal coordinate, thereby determining the at least one difference in the at least one light property of the at least one light beam originating from the at least one object.

14. A spectrometer device according to claim 1 configured for an application selected from the group consisting of: an infrared detection application; a heat detection application; a thermometer application; a heat-seeking application; a flame-detection application; a fire-detection application; a smoke-detection application; a temperature sensing application; a spectroscopy application; an exhaust gas monitoring application; a combustion process monitoring application; a pollution monitoring application; an industrial process monitoring application; a chemical process monitoring application; a food processing process monitoring application; a water quality monitoring application; an air quality monitoring application; a quality control application; a temperature control application; a motion control application; an exhaust control application; a gas sensing application; a gas analytics application; a motion sensing application; a chemical sensing application; a mobile application; a medical application; a mobile spectroscopy application; a food analysis application.

* * * * *